(12) United States Patent
Liao et al.

(10) Patent No.: US 11,514,634 B2
(45) Date of Patent: Nov. 29, 2022

(54) PERSONALIZED SPEECH-TO-VIDEO WITH THREE-DIMENSIONAL (3D) SKELETON REGULARIZATION AND EXPRESSIVE BODY POSES

(71) Applicants: Baidu USA, LLC, Sunnyvale, CA (US); Baidu.com Times Technology (Beijing) Co., Ltd., Beijing (CN)

(72) Inventors: Miao Liao, San Jose, CA (US); Sibo Zhang, San Jose, CA (US); Peng Wang, Sunnyvale, CA (US); Ruigang Yang, Beijing (CN)

(73) Assignees: Baidu USA LLC, Sunnyvale, CA (US); Baidu.com Times Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/980,373

(22) PCT Filed: Jun. 12, 2020

(86) PCT No.: PCT/CN2020/095891
§ 371 (c)(1),
(2) Date: Sep. 11, 2020

(87) PCT Pub. No.: WO2021/248473
PCT Pub. Date: Dec. 16, 2021

(65) Prior Publication Data
US 2021/0390748 A1    Dec. 16, 2021

(51) Int. Cl.
*G06T 13/00*       (2011.01)
*G06T 13/40*       (2011.01)
(Continued)

(52) U.S. Cl.
CPC ............ *G06T 13/40* (2013.01); *G06K 9/6256* (2013.01); *G06N 3/0454* (2013.01); *G06N 3/08* (2013.01);
(Continued)

(58) Field of Classification Search
None
See application file for complete search history.

(56) References Cited

U.S. PATENT DOCUMENTS 5,970,453 A    10/1999  Sharman
7,412,393 B1    8/2008  De Fabbrizio
(Continued)

FOREIGN PATENT DOCUMENTS

CN    104732590 A    6/2015
CN    108537743 A    9/2018
(Continued)

OTHER PUBLICATIONS

Thies et al.,"Neural voice puppetry:Audio-driven facial reenactment," arXiv preprint arXiv:1912.05566, 2019. (23 pgs).
(Continued)

*Primary Examiner* — Martin Mushambo
(74) *Attorney, Agent, or Firm* — North Weber & Baugh LLP

(57) ABSTRACT

Presented herein are novel embodiments for converting a given speech audio or text into a photo-realistic speaking video of a person with synchronized, realistic, and expressive body dynamics. In one or more embodiments, 3D skeleton movements are generated from the audio sequence using a recurrent neural network, and an output video is synthesized via a conditional generative adversarial network. To make movements realistic and expressive, the knowledge of an articulated 3D human skeleton and a learned dictionary of personal speech iconic gestures may be
(Continued)

embedded into the generation process in both learning and testing pipelines. The former prevents the generation of unreasonable body distortion, while the later helps the model quickly learn meaningful body movement with a few videos. To produce photo-realistic and high-resolution video with motion details, a part-attention mechanism is inserted in the conditional GAN, where each detailed part is automatically zoomed in to have their own discriminators.

24 Claims, 13 Drawing Sheets

(51) Int. Cl.
  *G06K 9/62* (2022.01)
  *G06N 3/08* (2006.01)
  *G10L 15/26* (2006.01)
  *G06N 3/04* (2006.01)
  *G10L 25/57* (2013.01)
  *G06V 40/20* (2022.01)

(52) U.S. Cl.
  CPC .............. *G06V 40/28* (2022.01); *G10L 15/26* (2013.01); *G10L 25/57* (2013.01)

(56) References Cited

U.S. PATENT DOCUMENTS

| | | |
|---|---|---|
| 8,160,877 B1 | 4/2012 | Nucci |
| 2006/0200344 A1 | 9/2006 | Kosek |
| 2007/0150271 A1 | 6/2007 | Virette |
| 2008/0167862 A1 | 7/2008 | Mohajer |
| 2012/0203557 A1 | 8/2012 | Odinak |
| 2013/0132085 A1 | 5/2013 | Mysore |
| 2013/0262096 A1 | 10/2013 | Wilhelms-Tricarico |
| 2014/0236597 A1 | 8/2014 | Ben Ezra |
| 2015/0199956 A1 | 7/2015 | Tan |
| 2015/0243275 A1 | 8/2015 | Luan |
| 2019/0189117 A1* | 6/2019 | Kumar ................. G06F 16/3329 |
| 2020/0204878 A1* | 6/2020 | Canton ................. H04N 21/84 |
| 2020/0294201 A1* | 9/2020 | Planche ................. G06F 30/27 |
| 2020/0320306 A1* | 10/2020 | Tian ........................ G06V 20/49 |
| 2020/0342646 A1* | 10/2020 | Wang ...................... H04N 5/265 |

FOREIGN PATENT DOCUMENTS

| | | |
|---|---|---|
| CN | 110489707 A | 11/2019 |
| WO | 2019090213 A1 | 5/2019 |

OTHER PUBLICATIONS

Thies et al.,"Deferred neural rendering: Image synthesis using neural textures," arXiv preprint arXiv:1904.12356, 2019. (12pgs).
Thies et al.,"Face2face:Real-time face capture and reenactment of rgb videos," In Proceedings of the IEEE conference on computer vision and pattern recognition, 2016. (9pgs).
Chan et al.,"Everybody dance now," In Proceedings of the IEEE International Conference on Computer Vision, 2019. (10pgs).
Liu et al.,"Liquid Warping GAN: A Unified Framework for Human Motion Imitation,Appearance Transfer and Novel View Synthesis," arXiv preprint arXiv:1909.12224, 2019. (11pgs).
Ginosar et al.,"Learning individual styles of conversational gesture," arXiv preprint arXiv:1906.04160, 2019. (11pgs).
Romero et al.,"Embodied Hands: Modeling and Capturing Hands and Bodies Together," ACM Transactions on Graphics (ToG), 2017. (17pgs).
Logan et al.,"Mel frequency cepstral coe cients for music modeling," In ISMIR, vol. 270, 2000, (13 pgs).
D. R Reddy, "Speech recognition by machine: A review," Proceedings of the IEEE vol. 64, No. 4, 1976. (31 pgs).

Hochreiter et al.,"Long short-term memory," Neural computation 9 (8), 1997. (32pgs).
International Search Report dated Mar. 1, 2021, in International Patent Application No. PCT/CN2020/095891, filed Jun. 12, 2020. (5pgs).
Written Opinion of the International Searching Authority dated Mar. 1, 2021, in International Patent Application No. PCT/CN2020/095891, filed Jun. 12, 2020. (4 pgs).
Graves et al.,"Framewise Phoneme Classification withBidirectional LSTM and Other Neural NetworkArchitectures," Neural networks 18, 2005. (8pgs).
Kingma et al.,"Adam: A method for stochastic optimization," arXiv preprint arXiv:1412.6980, 2014. (15 pgs).
Wikipedia, "Audio normalization," [online], [Retrieved Sep. 11, 2020], Retrieved from Internet <URL: https://en.wikipedia.org/wiki/Audio_normalization> (2pgs).
Wikipedia, "Root mean square," [online], [Retrieved Sep. 11, 2020], Retrieved from Internet <URL: https://en.wikipedia.org/wiki/Root_mean_square> (4pgs).
Suwajanakorn et al.,"Synthesizing Obama: Learning Lip Sync from Audio," ACM Transactions on Graphics (TOG), 2017. (13pgs).
Taylor et al.,"A deep learning approach for generalized speech animation," ACM Transactions on Graphics (TOG), 2017. (16 pgs).
Kim et al.,"LumièreNet: Lecture Video Synthesis from Audio," arXiv preprint arXiv:1907.02253, 2019. (9 pgs).
Ge et al.,"3D Hand Shape and Pose Estimation from a Single RGB Image," arXiv preprint arXiv:1903.00812, 2019. (12pgs).
Kanazawa et al.,"Learning 3D Human Dynamics from Video," arXiv preprint arXiv:1812.01601, 2019. (12pgs).
Pavllo et al.,"3D human pose estimation in video with temporal convolutions and semi-supervised training," arXiv preprint arXiv:1811.11742, 2019. (13pgs).
Cao et al.,"OpenPose: Realtime Multi-Person 2D PoseEstimation using Part Affinity Fields," arXiv preprint arXiv:1812.08008,2019. (14pgs).
Pavlakos et al.,"Expressive body capture: 3D hands, face, and body from a single image," arXiv preprint arXiv:1904.05866, 2019. (22pgs).
Karras et al.,"Audio-driven facial animation by joint end-to-end learning of pose and emotion," ACM Transactions on Graphics (TOG), 2017. (12 pgs).
Shlizerman et al.,"Audio to body dynamics," arXiv preprint arXiv:1712.09382, 2017. (10pgs).
Yan et al.,"Convolutional sequence generation for skeleton-based action synthesis," In Proceedings of the IEEE International Conference on Computer Vision, 2019. (9pgs).
Martinez et al.,"On human motion prediction using recurrent neural networks," arXiv preprint arXiv:1705.02445, 2017. (10pgs).
Li et al.,"Auto-conditioned recurrent networks for extended complex human motion synthesis," arXiv preprint arXiv:1707.05363, 2017. (13 pgs).
Isola et al.,"Image-to-image translation with conditional adversarial networks," arXiv preprint arXiv:1611.07004, 2018. (17pgs).
Wang et al.,"High-Resolution Image Synthesis and Semantic Manipulation with Conditional GANs," arXiv preprint arXiv:1711.11585, 2018. (14pgs).
Wang et al.,"Video-to-video synthesis," arXiv preprint arXiv:1808.06601, 2018. (14pgs).
Shysheya et al.,"Textured neural avatars," arXiv preprint arXiv: 1905.08776, 2019. (11pgs).
Cai et al.,"Deep video generation, prediction and completion of human action sequences," arXiv preprint arXiv:1711.08682, 2017. (10pgs).
Mittal et al.,"Animating face using disentangled audio representations," arXiv preprint arXiv:1910.00726, 2019. (9pgs).
Suwajanakorn et al.,"Synthesizing Obama: learning lip sync from audio," ACM Transactions on Graphics (TOG), vol. 36, No. 4, pp. 95, 2017. (13 pgs).
Thies et al.,"Neural voice puppetry:Audio-driven facial reenactment," arXiv preprint arXiv: 1912.05566, 2019. (12 pgs).
Liao et al.,"Speech2Video Synthesis with 3D Skeleton Regularization and Expressive Body Poses,"In Proceedings of the Asian Conference on Computer Vision (ACCV), 2020. (16 pgs).

(56) References Cited

OTHER PUBLICATIONS

Ezzat et al., "Visual Speech Synthesis by Morphing Visemes," International Journal of Computer Vision, 2002. (14 pgs).

Taylor et al.,"Dynamic Units of Visual Speech," in Proceedings of the 11th ACM SIGGRAPH/Eurographics conference on Computer Animation, 2012. [Abstract] (5pgs).

Fried et al.,"Text-based editing of talking-head video," arXiv preprint arXiv:1906.01524, 2019. (14 pgs).

Chen et al.,"Hierarchical Cross-Modal Talking Face Generation with Dynamic Pixel-Wise Loss," arXiv preprint arXiv:1905.03820, 2019. (10pgs).

Zhou et al.,"Talking face generation by adversarially disentangled audio-visual representation," arXiv preprint arXiv:1807.07860, 2019. (9pgs).

Wang et al.,"Speech Driven Talking Head Generation via Attentional Landmarks Based Representation," Proc. Interspeech 2020, pp. 1326-1330, 2020. (5 pgs).

Taylor et al., "A Deep Learning Approach for Generalized Speech Animation," ACM Transactions on Graphics (TOG), vol. 36, No. 4, pp. 1-11, 2017. (11 pgs).

Ginosar et al.,"Learning Individual Styles of Conversational Gesture," in Proceedings of the IEEE Conference on Computer Vision & Pattern Recognition, 2019. (10 pgs).

Thies et al.,"Deferred Neural Rendering:lmage synthesis using neural textures," arXiv preprint arXiv:1904.12356, 2019. (12pgs).

H. Ren, "On the Acoustic Structure of Diphthongal Syllables," Ph.D. thesis, UCLA, 1986. (114pgs).

[online], [Retrieved Apr. 5, 2022]. Retrieved from Internet <URL: https://escholarship.org/uc/item/8431z0hn>.

Cao et al.,"OpenPose: realtime multi-person 2D pose estimation using Part Affinity Fields," in arXiv preprint arXiv:1812.08008, 2018. (14 pgs).

Yuan et al.,"Speaker identification on the scotus corpus," The Journal of the Acoustical Society of America, vol. 123, 2008. (4 pgs).

Wang et al.,"Video-to-video synthesis," in Advances in Neural Information Processing Systems (NeurIPS), 2018. (14 pgs).

Sanderson et al., "Multi-region probabilistic histograms for robust and scalable identity inference," In International conference on biometrics, 2009. (11 pgs).

Garofolo et al.,"TIMIT Acoustic-Phonetic Continuous Speech Corpus," Linguistic Data Consortium, 1993. (94pgs).

Hunt et al.,"Unit selection in a concatenative speech synthesis system using alarge speech database,"1996 IEEE Intr. Conf. on Acoustics,Speech,& Signal Processing, 1996.(4pgs).

Isola et al.,"lmage-to-image translation with conditional adversarial networks," In Computer Vision and Pattern Recognition (CVPR), 2017 IEEE Conference, 2017. (10 pgs).

D. Klatt, "Software for a cascade/parallel formant synthesizer," Journal of the Acoustical Society of America, 67:971-995, 1980. (25 pgs).

Ping et al.,"Deep voice 3: Scaling text-to-speech with convolutional sequence learning," Proceedings of ICLR 2018, 2018. (16 pgs).

Prajwal et al.,"A lip sync expert is all you need for speech to lip generation in the wild," arXiv preprint arXiv:2008.10010, 2020. (10pgs).

Shen et al.,"Natural TTS Synthesis By Conditioningwavenet On MEL Spectrogram Predictions," arXiv preprint arXiv:1712.05884, 2018. (5pgs).

P. Taylor, "Text-to-Speech Synthesis," Cambridge University Press, 2009. (627pgs).

Tokuda et al.,"An HMM-Based Speech Synthesis System Applied To English," Proceedings of 2002 IEEE Workshop on Speech Synthesis, 2002. (4pgs).

Van den Oord et al.,"WAVENET: A Generative Model for Raw Audio,"arXiv preprint arXiv:1609.03499, 2016. (15ps).

Wang et al.,"Few-shot Video-to-Video Synthesis," arXiv preprint arXiv:1910.12713, 2019. (14pgs).

Notice of Allowance And Fee(s) Due, dated Sep. 8, 2022, in the related matter U.S. Appl. No. 17/221,701. (11pgs).

* cited by examiner

PERSONALIZED SPEECH-TO-VIDEO WITH THREE-DIMENSIONAL (3D) SKELETON REGULARIZATION AND EXPRESSIVE BODY POSES

CROSS-REFERENCE TO RELATED APPLICATIONS

This patent application is filed pursuant to 35 USC § 371 as a US National Phase Application of International Patent Application No. PCT/CN2020/095891, filed on 12 Jun. 2020, entitled "PERSONALIZED SPEECH-TO-VIDEO WITH THREE-DIMENSIONAL (3D) SKELETON REGULARIZATION AND EXPRESSIVE BODY POSES," listing Miao Liao, Sibo Zhang, Peng Wang, and Ruigang Yang as inventors, which patent document is incorporated by reference herein in its entirety and for all purposes.

TECHNICAL FIELD

The present disclosure relates generally to systems and methods for computer learning that can provide improved computer performance, features, and uses. More particularly, the present disclosure relates converting a given speech input, whether audio or text, into a photo-realistic video of a speaker.

BACKGROUND

Neural networks have achieved great successes in many domains, such as computer vision, natural language processing, recommender systems, and the like. One application is to attempt to covert a speech input, such as an audio input or text input, into a synthesized video. Specifically, speech-to-video is a task of synthesizing a video of human full-body movements, including head, mouth, arms etc., from a speech input. Speech-to-video can be useful in a number of ways and in a number of fields. For example, synthesized video content may be used for entertainment purposes, such as video content, movies, and video games, for educational purposes, such as tutorials, lectures, and other educational content, and for other purposes, such as website promotional or instructive videos, simulations, human-computer interfaces, and for other purposes. Preferably, the synthesized video content should be visually natural and consistent with the given speech.

Traditional ways of attempting to do speech-to-video involves performance capture with dedicated devices and professional operators. Most of the speech and rendering tasks are performed by a team of animators, which is often costly for custom usage. Recently, with deep neural networks and data-driven approaches have been proposed for low cost speech video synthesis. For instances, SythesisObama and MouthEditting focus on synthesizing a talking mouth by driving mouth motion with speech using a recurrent neural network. Others propose to drive a high-fidelity graphics model using audio, where not only the mouth is animated but also other parts on the face are animated to obtain richer speech expressions. However, in these mouth-dominate movement approaches, mouth movement synthesis is mostly deterministic. That is, given a pronunciation, the movement or shape of the mouth is similar across different people and different contexts. In contrast, a full body gesture movement under the same situation is much more complex, in part, because of the large degree of variations. Unlike mouth movements, which conform to a more ridge set of movements, gestures are highly dependent on current context and on the person who is speaking.

Accordingly, what is needed are approaches for converting a given speech input, whether audio input or text input, into a photo-realistic video of a speaker, where the output video has synchronized, realistic, and expressive body dynamics.

SUMMARY

Embodiments of the present disclosure provides a computer-implemented method, a system and a computer-readable medium for training a system to generate a video of a person given an input text or an input audio, a computer-implemented method, a system and a computer-readable medium for synthesizing a video of a person given an input speech data.

According to a first aspect, some embodiments of the present disclosure provides a computer-implemented method for training a system to generate a video of a person given an input text or an input audio, the method includes: given an input video comprising a person speaking and gesturing, using the input video and a joint three-dimensional (3D) model of a human body, face, and hands to generate a set of 3D poses corresponding to the person speaking and gesturing in the input video; using speech information related to the person speaking in the input video and a neural network model to generate a set of hidden states, which represent a set of 3D poses; comparing the set of hidden states from the neural network model with the set of 3D poses from the joint 3D model of a human body, face, and hands to train the neural network model, in which the set of 3D poses from the joint 3D model of a human body, face, and hands are treated as ground truth data; using the input video, the set of 3D poses from the joint 3D model of a human body, face, and hands, and a video generative adversarial network (GAN) to train a generative network of the video GAN to generate a video; and outputting the trained neural network and the trained generative network.

According to a second aspect, some embodiments of the present disclosure provides computer-implemented method for synthesizing a video of a person given an input speech data, the method includes: generating a set of speech representations corresponding to the input speech data; inputting the set of speech representations into the trained neural network to generate an initial set of three-dimensional (3D) poses corresponding to the set of speech representations; identifying, using the input speech data, a set of words in the input speech data that correspond to a set of word entries in a key pose dictionary, which comprises, for each word entry in the key pose dictionary, one or more poses; responsive to identifying a word in the set of words from the input speech data that exists in the key pose dictionary that is set for replacement, forming a final set of 3D poses by replacing a set of one or more 3D poses from the initial set of 3D poses that are correlated to occurrence of the word in the initial set of 3D poses with a replacement set of one or more 3D poses obtained from the key pose dictionary that corresponds to the word; and generating a video of a person that poses in correspondence with the input speech data using the final set of 3D poses as an input into a trained generative network.

According to a third aspect, some embodiments of the present disclosure provides a non-transitory computer-readable medium or media, the medium or media includes one or more sequences of instructions which, when executed by one or more processors, causes the method according to the first aspect to be implemented.

According to a fourth aspect, some embodiments of the present disclosure provides a system for training a system to generate a video of a person given an input text or an input audio, the system includes at least one processor, and a memory storing instructions, the instruction when executed by the at least one processor, cause the at least one processor to perform the method according to the first aspect.

According to a fifth aspect, some embodiments of the present disclosure provides a non-transitory computer-readable medium or media, the medium or media includes one or more sequences of instructions which, when executed by one or more processors, causes the method according to the second aspect to be implemented.

According to a sixth aspect, some embodiments of the present disclosure provides a system for training a system to generate a video of a person given an input text or an input audio, the system includes at least one processor, and a memory storing instructions, the instruction when executed by the at least one processor, cause the at least one processor to perform the method according to the second aspect.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
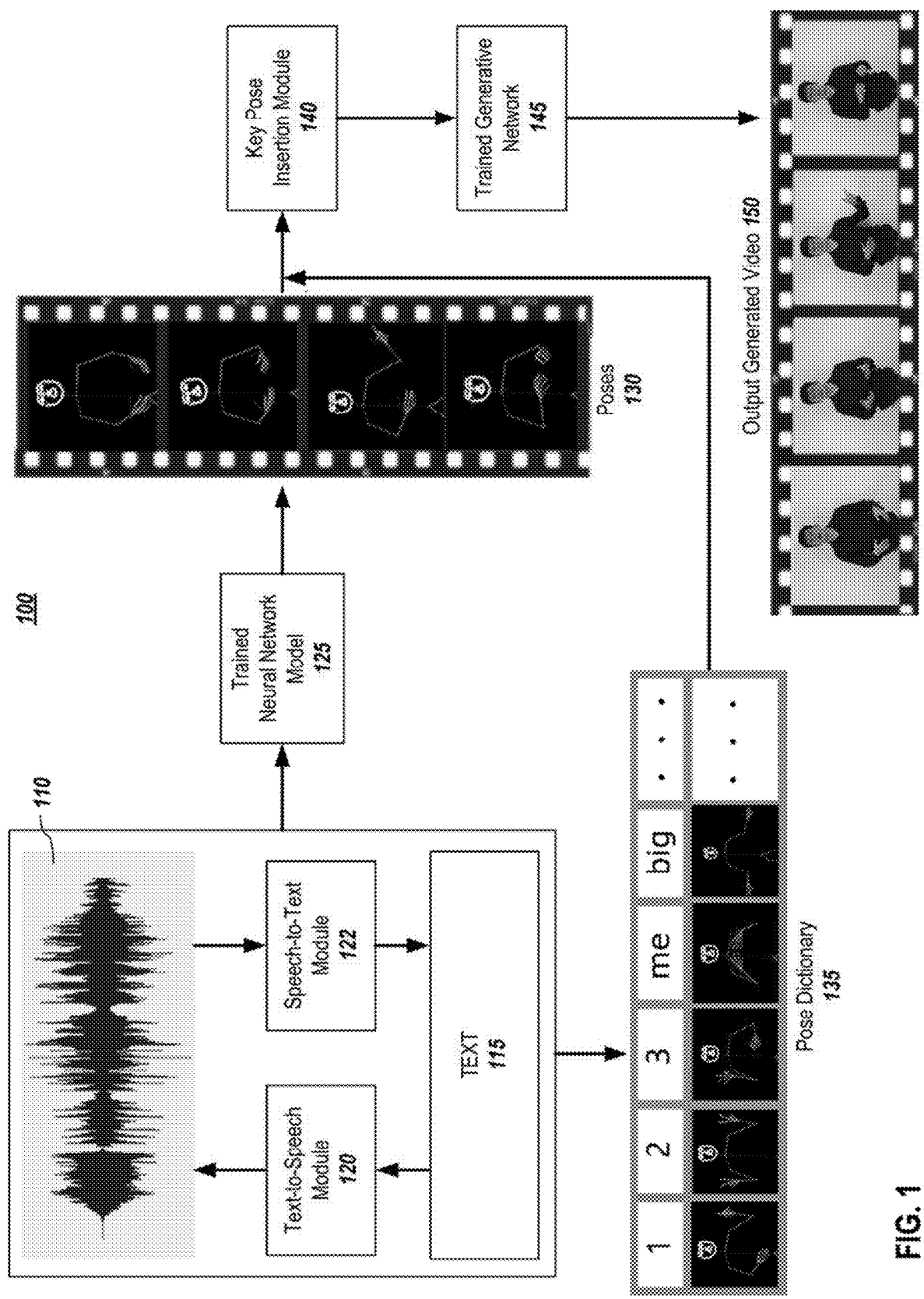
FIG. 1 depicts a system for generating a video of a person speaking and gesturing, according to embodiments of the present disclosure

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," and "comprising" shall be understood to be open terms and any lists the follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. General Introduction

Presented herein are embodiments of converting speech in either a text or audio form into a video by synthesizing a video of human full body movements, including head, mouth, arms etc., where the produced video appears visually natural and consistent with the given speech input. As noted above, traditional ways of speech-to-video (Speech2Video) conversion involve performance capture with dedicated devices and professional operators, and most of the speech and rendering tasks are performed by a team of animators, which is often costly for custom usage.

Also as noted above, data-driven approaches have been proposed for low-cost speech video synthesis. However, the approaches focus primarily on synthesizing mouth motion or mouth motion with some other parts on the face. But, as noted above, mouth movement synthesis is mostly deterministic, i.e., given a pronunciation, the movement or shape of the mouth is similar across different persons and context. Such constraints do not exist for body gestures.

An objective of the Speech2Video embodiments herein is to address full-body synthesis—a full-body gesture movement under the same situation is more generative and has more variations. For example, the gestures are highly dependent on current context and individual person who is speaking. Personalized speaking gestures appear at certain moment when delivering important messages. Therefore, useful information is only sparsely present in a video, yielding difficulties for a simple end-to-end learning algorithm to capture this diversity from the limited recorded videos.

LumiereNet (Kim, H., Garrido, P., Tewari, A., Xu, W., Thies, J., Nießner, M., Pérez, P., Richardt, C., Zollhöfer, M., Theobalt, C., "Deep Video Portraits," in *ACM Transactions on Graphics (TOG)* 37(4), 1-14 (2018)) attempts to performing a similar task by building an end-to-end network for full upper body synthesizing. However, in their experiments, the body motion is less expressive where the major dynamics are still located at the talking head. A similar methodology pipeline for body synthesis was built, which was trained with collected speech videos. This approach possessed at least three major issues. First, as discussed, the generated body movements only had repetitive patterns, while the ground truth video contained emphasis gestures at certain moments. Second, the generated body appearance at detailed parts, such as hand and elbow, could be unnaturally distorted, which is geometrically infeasible. Last, the generated body and hand appearance were blurry with motions.

Therefore, in this patent document, embodiments of a novel trainable Speech2Video pipeline are presented, which address these issues simultaneously. For handling diversity issues, in one or more embodiments, a pose dictionary is built with text for each person from their presentation videos. To guarantee the generated pose are physical plausible, in one or more embodiments, the three-dimensional (3D) skeleton is enforced as the intermediate representations, i.e., the generated joints should follow the regularity of anthropometric. Finally, to ensure high quality synthesized appearance, in one or more embodiments, a part-aware discriminator was developed and used to provide additional attention of generated detailed parts, like face and hands.

Finally, to better evaluate test embodiments, a dataset was created with recorded speech videos of several targets while they were reading some selected articles, using camera with high resolution and high frame rate (FPS). In the experiments, it was shown that the tested embodiment generated perceptually significantly better human dynamics than other existing pipelines with more gesture variations.

Some of the contributions are summarized below:

- Embodiments of a novel two-stage pipeline of generating an audio-driven (which should be construed to include either audio input or text input) virtual speaker with full-body motions including the face, hand, mouth and body. Embodiments of the 3D driven approach overcome issues of direct audio-to-video approach where human appearance details may be missing. And, the embodiments also make it possible to insert key poses in the human motion sequence. It is shown in the result section why this task preferably decomposed into a two-stage generation, instead of direct audio-to-video generation.
- A dictionary of personal key poses is built that adds more dimensions to the generated human poses. In addition, embodiments are presented for inserting key poses into the existing sequence.
- In one or more embodiments, 3D skeleton constraints are embedded to generate body dynamics, which guarantees the pose is physically plausible.
- Embodiments of a modified GAN are presented that emphasize on face and hands to recover more details in the final output video.

B. Some Related Work

Human Body Pose Estimation and Fitting. Ge, L., Ren, Z., Li, Y., Xue, Z., Wang, Y., Cai, J., Yuan, J., "3D Hand Shape And Pose Estimation From A Single RGB Image," in *Proceedings of the IEEE Conference on Computer Vision and Pattern Recognition*, pp. 10833-10842 (2019) proposed 3D shape and pose estimation specific for hands. Others have attempted to predict 3D human motion from video or a single image, but they are limited to fit human model with limb only, not hands or face. While OpenPose (Cao, Z., Hidalgo, G., Simon, T., Wei, S. E., Sheikh, Y., "OpenPose: Realtime Multi-Person 2D Pose Estimation using Part Affinity Fields, available at arxiv preprint, arXiv:1812.08008

(2018)) has had some success at fitting a detailed human model to a 2D image with all its demanded parts, including face and fingers; their output is 2D landmarks in the image space. Based on OpenPose, SMPL-X (Pavlakos, G., Choutas, V., Ghorbani, N., Bolkart, T., Osman, A. A. A., Tzionas, D., Black, M. J., "Expressive Body Capture: 3D Hands, Face, and Body From a Single Image," in *Proceedings IEEE Conf. on Computer Vision and Pattern Recognition (CVPR)* (2019)) fits a 3D skeleton to those output 2D landmarks through an optimization. It also parameterizes human motion as joint angles, making it much easier to constrain joints under reasonable human articulation.

Audio to Motion.

Some drive a high-fidelity 3D facial model using audio via end-to-end learning, where both poses and emotions are learned. Others have focused on synthesizing hand motion from music input, rather than speech. A goal is to animate graphics models of hands and arms with piano or violin music. Yet others generate skeleton-based action using Convolutional Sequence Generation Network (CSGN). Some, instead, predict human motion using recurrent neural networks. Some use auto-conditioned recurrent networks for extended complex human motion synthesis. They attempt to model more complex motions, including dances or martial arts. One or more embodiments herein use an RNN to learn a mapping from audio to motions. However, in one or more embodiments, a relaxed requirement on the output motion is used. Instead of having an output match the ground truth, in one or more embodiments, a focus is on the result motion being correlated to audio, as long as it looks natural and smooth.

Video Generation from Skeleton.

pix2pix (Isola, P., Zhu, J. Y., Zhou, T., Efros, A. A., "Image-To-Image Translation with Conditional Adversarial Networks," in 2017 IEEE Conference on Computer Vision and Pattern Recognition (CVPR), (2017)) was a milestone in the development of Generative Adversarial Networks (GANs). It outputs a detailed real-life image from an input semantic label image. In one or more embodiments, the semantic label maps are image frames of the human skeleton. Nevertheless, direct applying pix2pix to an input video without temporal constraints can result in incoherent output videos. Therefore, vid2vid (Wang, T. C., Liu, M. Y., Zhu, J. Y., Liu, G., Tao, A., Kautz, J., Catanzaro, B., "Video-to-Video Synthesis," in *Advances in Neural Information Processing Systems (NeurIPS)* (2018)) was proposed to enforce temporal coherence between neighboring frames. Other proposed to render realistic video from skeleton models without building a 3D model, where the second stage of video generation was emphasized. However, it does not take care of facial expression and mouth movement, and it does not address the problem of how to generate realistic movement of the skeleton body model. Yet others proposed a similar pipeline, which generates skeleton pose first and then generate the final video. However, rather than audio, its input is random noise and its skeleton model is a very simple one—only having body limbs. That means its final output video lacks details on the face and fingers. In contrast, skeleton model embodiments herein comprise limbs, face, and fingers. In one or more embodiments, a vid2vid implementation is used to create final videos from the skeleton and get superior results; however, to obtain details on face and hands, the vid2vid GAN implementation was significantly modified to put more weights on these parts in the discriminator loss.

Character Synthesis. Some researchers focus on synthesizing a talking head by driving mouth motion with speech using an RNN. When the mouth sequence is generated via texture mapping, it is pasted onto an existing video after lighting and texture fusion. Some have attempted to produce videos of an upper-body of a virtual lecturer, but the only moving part is still the mouth. Face2Face (Thies, J., Zollhofer, M., Stamminger, M., Theobalt, C., Nießner, M., "Face2Face: Real-Time Face Capture and Reenactment of RGB Videos," in *Proceedings of the IEEE Conference on Computer Vision and Pattern Recognition (CVPR)*, pp. 2387-2395 (2016)) transfers expressions from a person to a target subject using a monocular RGB camera. Given a video of a dancing person, some transfers the dancing motion to another person, even though the second person does not know how to dance. The second person is only required to record a video of a few poses. While achieving good results, there are still visible distortion and blurriness on the arms, not to mention details of hands. Liquid Warping GAN (Liu, W., Zhixin Piao, Min Jie, W. L. L. M., Gao, S., "Liquid Warping GAN: A unified framework for human motion imitation, appearance transfer and novel view synthesis," in the *IEEE International Conference on Computer Vision (ICCV)* (2019)) is a recent work to synthesize human videos of novel poses, viewpoints, and even clothes. They have achieved decent results given that their input is simply a single image. Their work is mainly focused on image/video generation, while one of the contributions of embodiments herein is simulating human motions. Yet others proposed a pipeline that generates a skeleton pose first and then generate the final video. However, rather than audio, its input is random noise and its skeleton model is very simple—only having body limbs. That means its final output video lacks details on the face and fingers. In contrast, a skeleton model used in one or more embodiments comprises limbs, face, and fingers.

C. Speech2Video Embodiments

1. Trained System Embodiments for Generating a Video

FIG. 1 depicts a system 100 for generating video of a person speaking and gesturing, according to embodiments of the present disclosure. As shown in FIG. 1, the input to the system 100 is audio 110 or text 115. In one or more embodiments, the input may depend upon what was used to train the neural network model 125, which may be a long short-term memory (LSTM) network. Alternatively, or additionally, in one or more embodiments, audio and text may be interchanged, given both text-to-speech (TTS) 120 and speech-to-text (STT) 122 technologies are mature and commercially available. Even if there are some wrongly recognized words/characters from a TTS engine 120 or an STT engine 122, the system 100 can tolerant these errors quite successfully because one of the purposes of the neural network 125 is to map texts/audios to body shapes. Therefore, wrong STT or TTS outputs are usually words with similar pronunciations to those of the true ones, meaning they are very likely to have similar spelling too. Therefore, they will eventually map to similar body shapes.

The output of the neural network 125 is a sequence of human poses 130. In one or more embodiments, the poses may be parametrized by body model, such as SMPL-X, which was referenced above, but other body models may be used. SMPL-X is a joint 3D model of the human body, face, and hands together. This dynamic joint 3D model is visualized as a sequence of 2D colorized skeleton images. These 2D images are further input into a generative network 145.

IN one or more embodiments, an implementation of the vid2vid generative network, which was referenced above, may be used to generate the final realistic people images 150—although other generative networks may be used.

It was found that while successfully synchronizing speech and movement, some neural network may only learn repetitive human motions most of the time, which results in boring looking videos. In order to make the human motion more expressive and various, in one or more embodiments, certain poses may be inserted into the output motions of the trained neural network 125 when some key words are spoken, for example, huge, tiny, high, low, and so on. In one or more embodiments, a pose dictionary 135 was created that maps those key words entries to their corresponding poses. Details about building a pose dictionary are discussed in more detail below.

Figure 2:
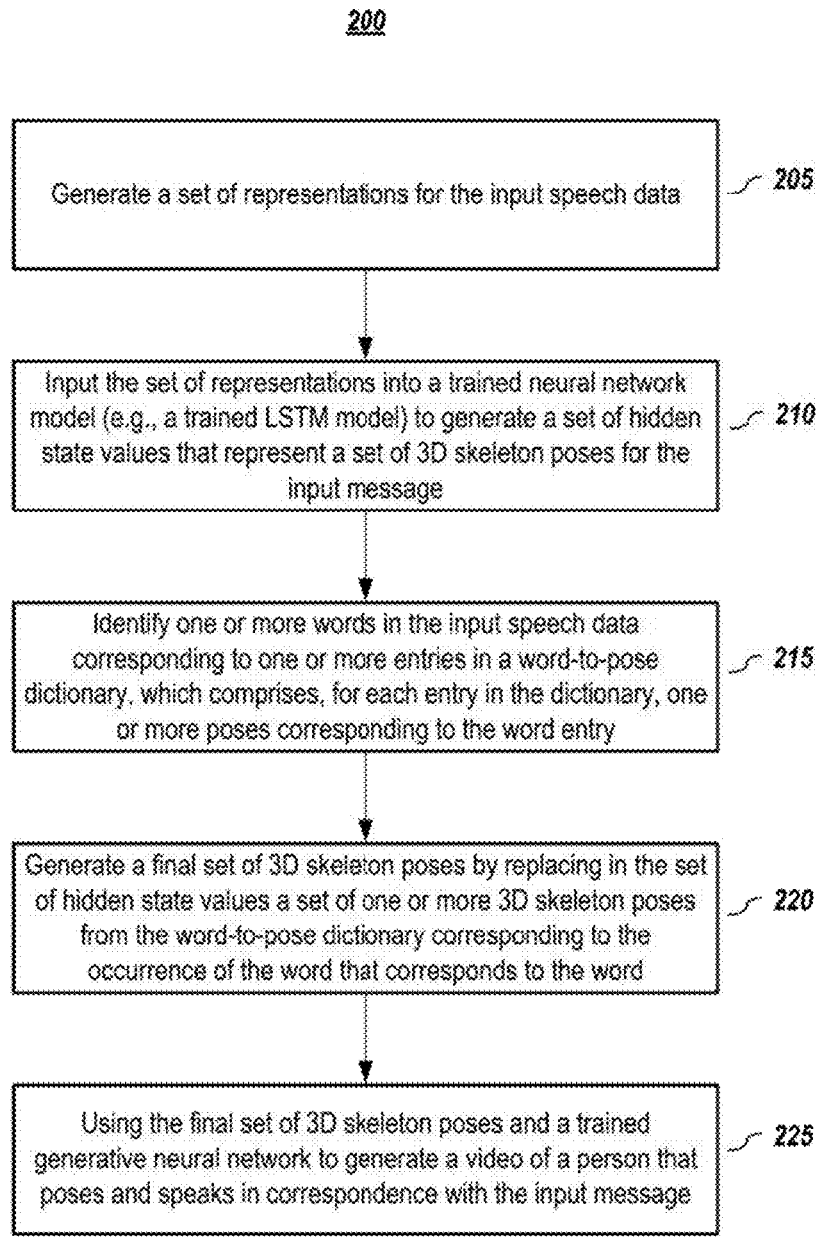
FIG. 2 depicts a method for generating a video using a trained system, according to embodiments of the present disclosure.

FIG. 2 depicts a method for generating a video using a trained system, according to embodiments of the present disclosure. In one or more embodiments, the input, whether audio or text, is used to generate (210) a set of representations for the input message. Different representations may be used particularly depending upon what used as input to the neural model 125 when it was being trained. For audio input, any of a number of methodologies may be employed to generate audio features for the input message, such as spectrograms, mel-spectrograms, mel-frequency cepstrum coefficients (MFCC), etc. More detailed examples are provided in the training section, below. For text input, the words may be converted in a numerical representation. For example, the words may be converted to ASCII (American Standard Code for Information Interchange) values and those may be directly used as inputs to the neural network. More detailed examples are provided in the training section, below. Also, as noted above, in one or more embodiments, the system (e.g., system 100) may include a speech-to-text module or a text-to-speech module to convert the input to the appropriate form for generating the set of representations. In yet another embodiment, the system 100 may include two trained neural networks—one trained to receive an audio-based set of representations and another one trained to receive a text-based set of representations—and the representations are routed to the appropriate trained neural network.

In any event, in one or more embodiments, the set of representations are input (210) into a trained neural network model 125 (e.g., a trained LSTM model) to generate a set of hidden state values that represent a set of 3D skeleton poses 130 for the input message.

In one or more embodiments, the input message is examined to determine if it contains (215) any words that correspond to entries in a word-entry-to-pose dictionary. As noted above (and as will be explained in more detail below), it may be beneficial to have certain key word, such as words with emphasis, important word, and the like have corresponding poses. For each word entry (which may comprise one or more words), the word-entry-to-pose dictionary has a corresponding set of one or more 3D skeleton poses. Using these corresponding 3D skeleton poses, a final set of 3D skeleton poses may be generated (220) by replacing in the set of hidden state values a set of one or more 3D skeleton poses from the word-to-pose dictionary corresponding to the occurrence of the word that corresponds to the word. In one or more embodiments, a key pose insertion module 140 may use one or more smoothing/blending methods to insert the key poses from the dictionary so that the movements have a smooth appearance.

In one or more embodiments, the final set of 3D skeleton poses and a trained generative neural network (e.g., trained generative network 145) are used (225) to generate a video (e.g., video 150) of a person that poses and speaks in correspondence with the input message. In one or more embodiments, the final set of 3D skeleton poses may be projected to a set of 2D projections of the 3D skeleton poses and the set of 2D projections may be input into the trained generative neural network to generate the video.

2. Training Embodiments

Figure 3:
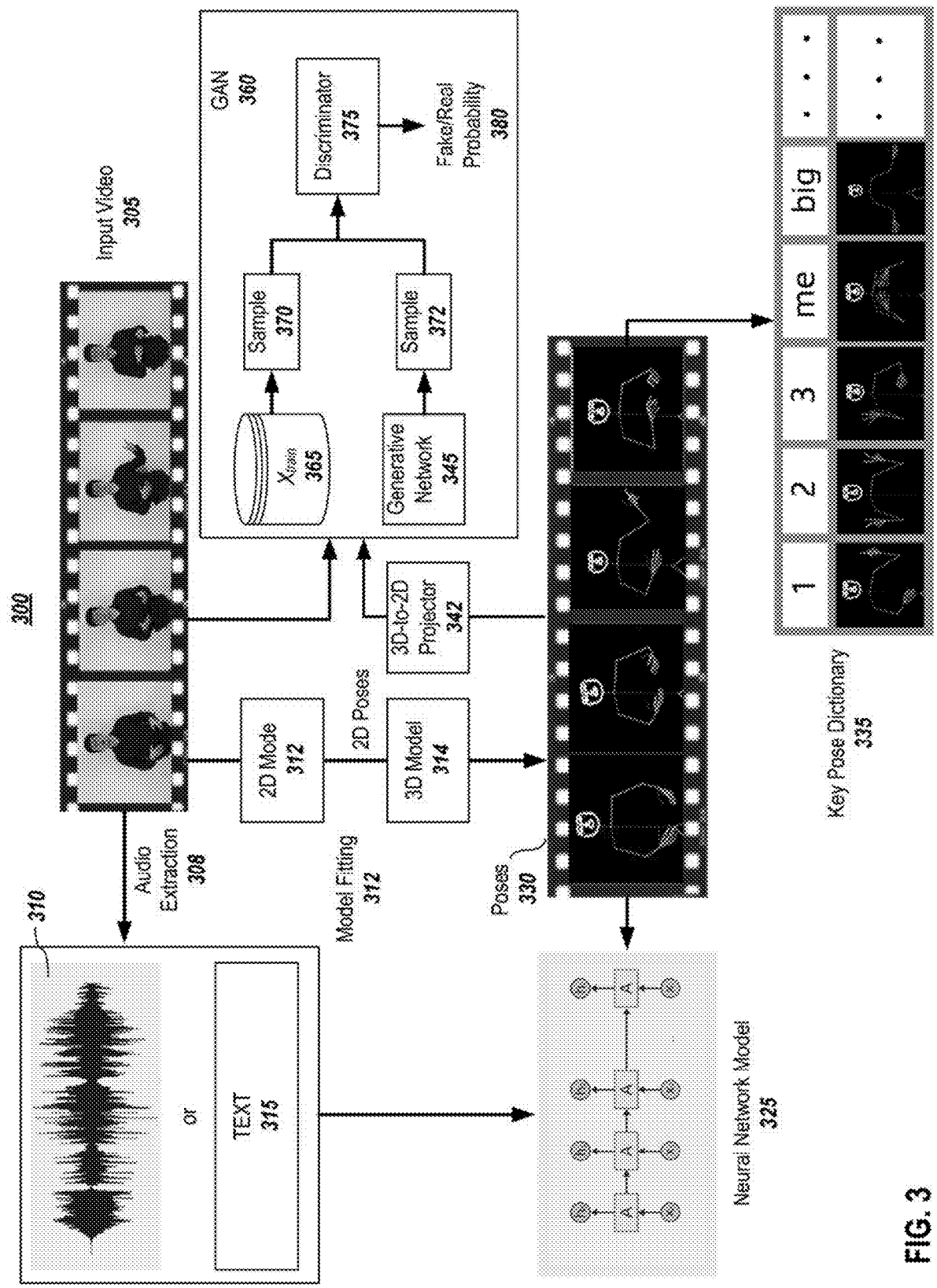
FIG. 3 depicts an overview of the training process for training a system to generate a video given an input message, according to embodiments of the present disclosure.
Figure 4:
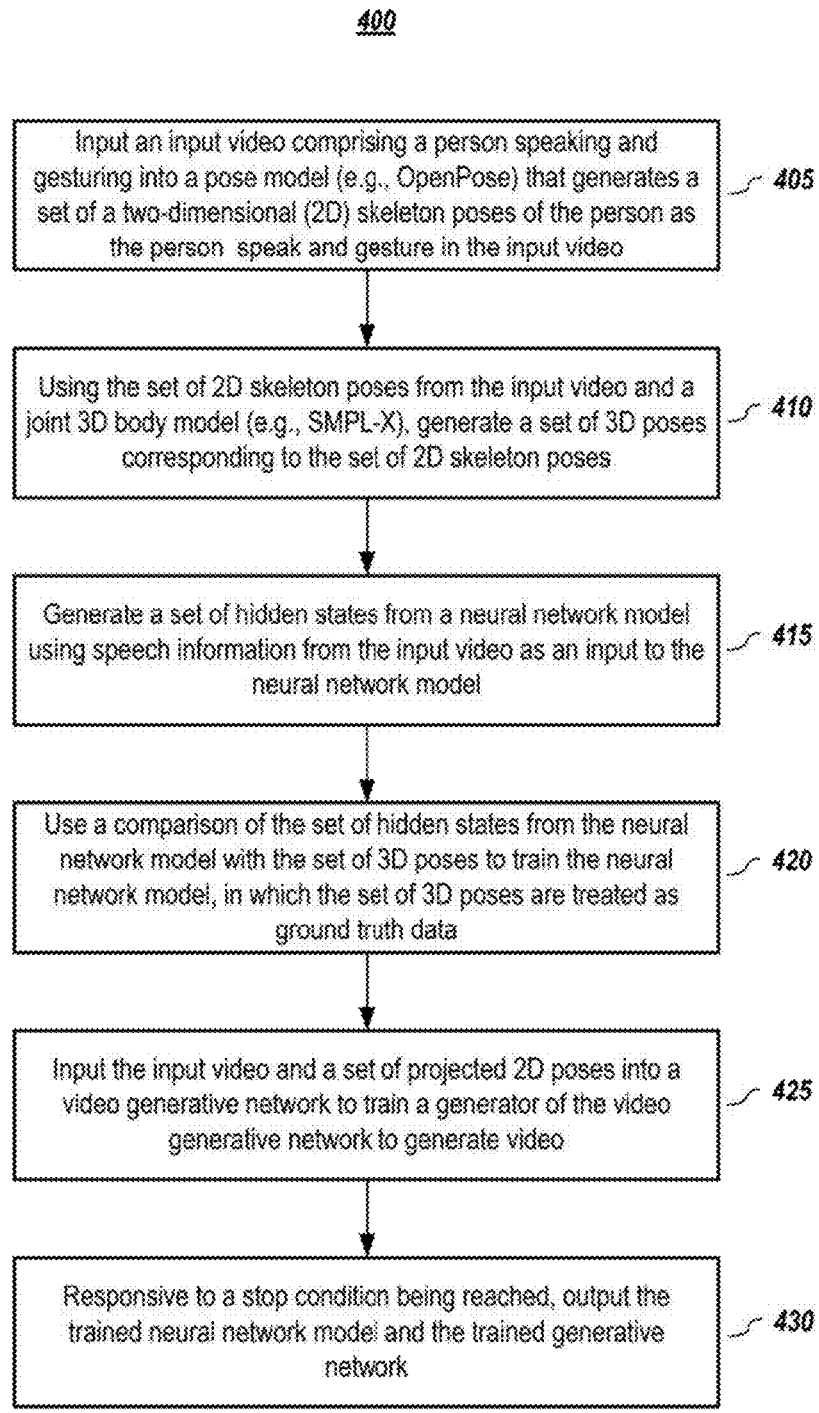
FIG. 4 depicts a method for training a system for generating a video of a person speaking and gesturing, according to embodiments of the present disclosure.

FIGS. 3 and 4 depict overviews of training processes for training a system to generate a video given an input message, according to embodiments of the present disclosure. In one or more embodiments, training the neural network 325 and the generative network 345 uses a video 305 of a target animation subject reading a script 315. As shown in FIG. 3, given a video 305 of a talking person, a human body model (312) may be fit (405) to each frame. In one or more embodiments, the set of poses 330, along with the representations of the extracted audio 308 or representations of the text 315, are fed into the neural network model 325 to train mapping from audio/text input to human poses, which may be referred to as a set of hidden values of the neural network 325. In one or more embodiments, the set of hidden states from the neural network model are compared with the set of 3D poses 330 to train (420) the neural network model, in which the set of 3D poses 330 are treated as ground truth data. In one or more embodiments, the 2D skeleton images of the human body model, which may be a 3D-to-2D projection of the poses 330, and their corresponding true person images 305 are used to train (425) the generative network (or generator) 360. In one or more embodiments, responsive to a stop condition being reached, the trained neural network mode and the trained generative network are output (430). Also, in one or more embodiments, some key poses are selected to build a dictionary 335 that maps key words to key poses.

3. FakeSpeech Dataset

In one or more embodiments, embodiments are capable of synthesizing anyone as long as there is speech videos which can be used for training. In reality, however, there may be limited training videos of adequate quality. Consider, for example online videos. Most of these videos are shot under auto exposure mode, meaning the exposure time could be as long as 33 milliseconds for 30 frames per second (fps) videos. It is extremely difficult to capture clear hand images under such long exposure time when the hands are moving. In fact, most of these frames have motion blur to some extent, which can cause problems when one tries to fit a hand-finger model to the images. In addition, it is preferable that the speaker be present in a constant viewpoint, but a lot of speech videos keep changing their viewpoint.

Figure 5A:
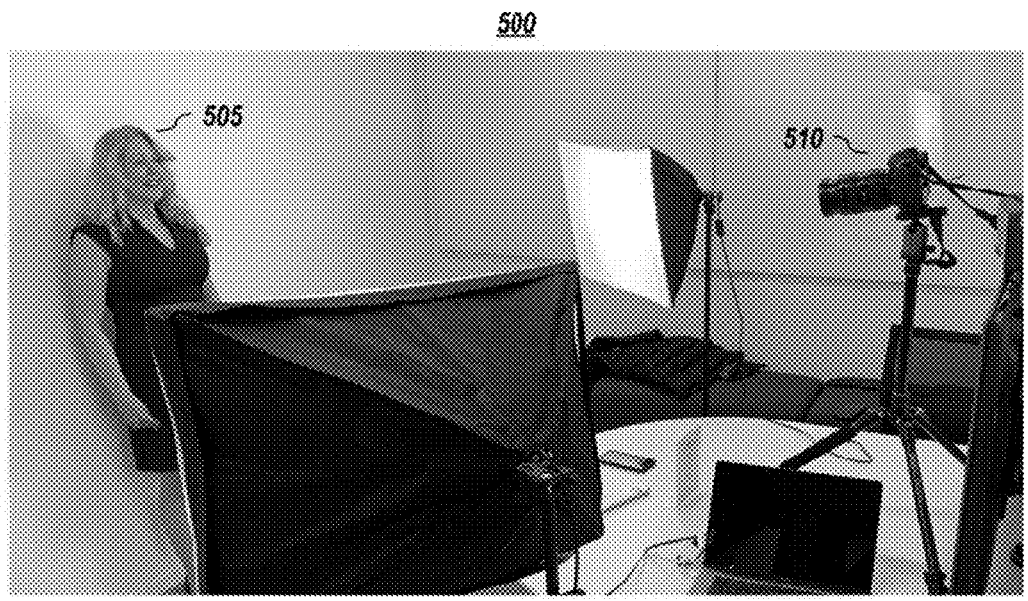
FIG. 5A shows a capture room with a speech model, according to embodiments of the present disclosure.

Embodiments herein focus on the video synthesis part and use existing state-of-the-art approaches to fit a human model. Therefore, it was decided to capture data. Two models were invited to present and a recording studio with a DSLR camera was set up. FIG. 5A shows a capture room 500 with a speech model 505, according to embodiments of the present disclosure. The DLSR camera 510 captures 1280×720 videos at 60 frames per second. The exposure time was set at 5 milliseconds so that little or no motion blur will be present in the frames. The speech model 505 stands in front of a camera 510 and screen, and a few videos are captured while he/she reads scripts on the screen.

Figure 5B:
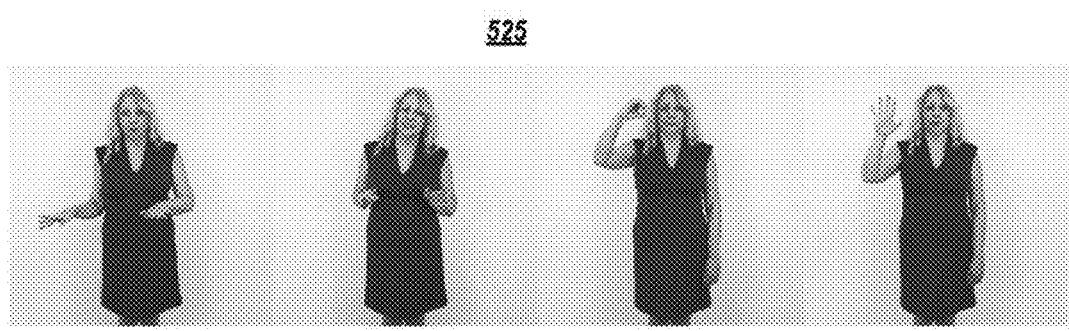
FIG. 5B shows some example poses correlated to certain key words, according to embodiments of the present disclosure.

The model 505 was also asked to pose for certain key words, such as huge, tiny, up, down, me, you, and so on. FIG. 5B shows some example poses 525 correlated to certain key words, according to embodiments of the present disclosure.

4. Body Model Fitting Embodiments

In one or more embodiments, fitting a human body model (e.g., 2D model 312 in FIG. 3) to images is equivalent to detecting human keypoints. OpenPose, which was cited above, has done excellent work on this front. OpenPose provides a real-time approach to detect the 2D pose of multiple people in an image, including body, foot, hand, and facial keypoints. It shall be noted that other 2D pose detection models may be used.

Figure 6:
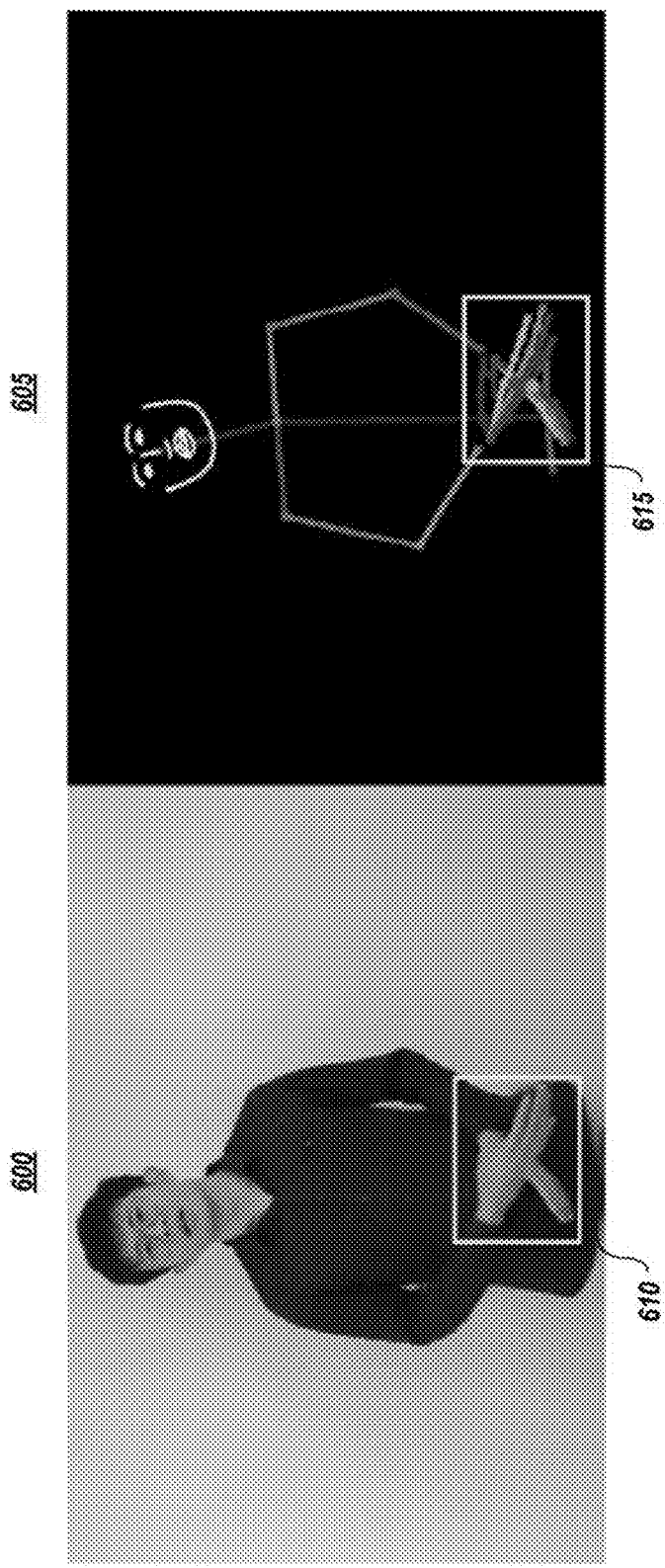
FIG. 6 show as example of distortion in the hands of a generated image.

In one or more embodiments, those 2D keypoints are taken as a representation of a human body model, and the neural network (e.g., an LSTM network) is trained that generates 2D positions of these keypoints from speech inputs. In some embodiments, the results were not quite satisfactory due to the distortion of output arm and hand. FIG. 6 show as example of distortion 610/615 in the hands of the generated image. As shown in FIG. 6, the distortion 615 in the model 615 results in an odd-looking distortion 610 in the generated image 600. This result is because in this simply 2D keypoint human model there is no relationship between two connected keypoints. They can virtually move to anywhere independently without constraints from other keypoints, leading to elongated or shorter arms and fingers. Furthermore, in one or more embodiments, at the stage of inserting key poses into existing body motion, it involves interpolating between two poses. Direct interpolation on 2D keypoints may result in invalid intermediate poses that violate human articulated structure.

Under these observations, in one or more embodiments, a true articulated 3D human model, such as SMPL-X, was adopted for use—although other 3D human models may be used. SMPL-X models human body dynamics using a kinematic skeleton model. It has 54 joints including neck, fingers, arms, legs, and feet. It is parameterized by a function $M(\theta, \beta, \psi)$, where $\theta \in R^{3(K+1)}$ is the pose parameter and K is the number of body joints plus an additional global body orientation. $\beta \in R^{|\beta|}$ is the shape parameter which controls the length of each skeleton bone. Finally, the face expression parameter is denoted by $\psi \in R^{|\psi|}$. There are a total of 119 parameters in SMPL-X model, 75 of which come from the global orientation as well as 24 joints, excluding hands, each denoted by a 3 degrees of freedom (DoF) axis-angle rotation. In one or more embodiments, the joints on hands are encoded separately by 24 parameters in a lower dimensional principal component analysis (PCA) space. In one or more embodiments, an approach described in Romero, J., Tzionas, D., Black, M. J., "Embodied Hands: Modeling and Capturing Hands and Bodies Together," ACM Transactions on Graphics (ToG) 36(6), 245 (2017) may be used. The shape and face expression both have 10 parameters, respectively.

In one or more embodiments, to fit SMPL-X human model (e.g., 3D model 314 in FIG. 3) to images, in general, one seeks to find optimal parameters that minimize $E(\theta, \beta, \psi)$, the weighted distance between 2D projection of those 3D joints and 2D detections of the corresponding joints by the OpenPose library. The weights may be determined by detection confidence scores, so that noisy detection will have less influence on the gradient direction. In one or more embodiments, the fitting code was modified to fix body shape parameters $\beta$ and global orientation during the optimization. Because embodiments herein are dealing with the same person within a video and the person is standing still during the entire video, in one or more embodiments, the human body parameter $\beta$ and human global orientation were computed for the first frame, and these values were used for the remaining frames. In one or more embodiments, the final objective function becomes $E(\theta, \psi)$, where a focus is to find optimal pose and facial expression parameters. This approach reduces the total number of parameters to 106 in one or more embodiments.

Thus, in one or more embodiments, the neural network (e.g., network 325 in FIG. 3) may be trained using 3D pose information and the speech input.

5. Dictionary Building and Key Pose Insertion Embodiments

Figure 7:
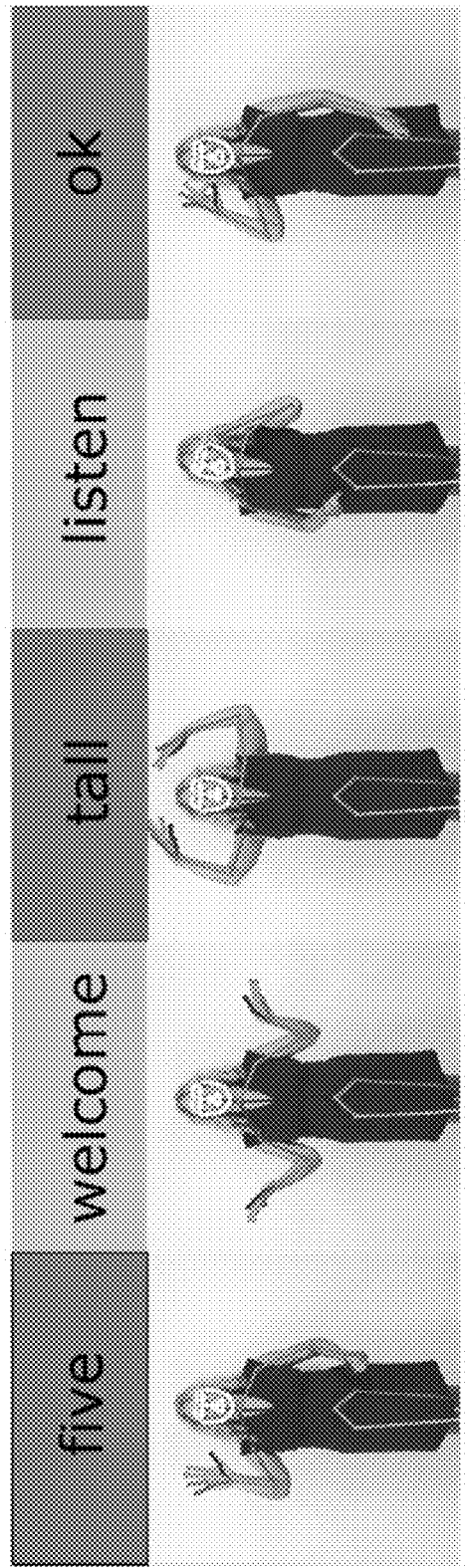
FIG. 7 graphically depicts a portion of a word-entry-to-pose lookup dictionary with example word entries and the corresponding key poses, according to embodiments of the present disclosure.

In one or more embodiments, a set of key poses were manually selected from the recorded videos and a word-entry-to-pose lookup dictionary was built. FIG. 7 graphically depicts a portion of a word-entry-to-pose lookup dictionary 700 with example word entries 705 and the corresponding key poses 710, according to embodiments of the present disclosure. In one or more embodiments, a key pose may be a still single frame pose or a multi-frame motion; similarly, the word entry may be a portion of a word (such as a syllable), a single word, or multiple words. In one or more embodiments, the pose is represented as 106 SMPL-X parameters. Whether a single frame pose or a set of poses/multi-frame motion, in one or more embodiments, the frame or frames may be inserted into an existing human skeleton video by the same or similar approaches.

Figure 8:
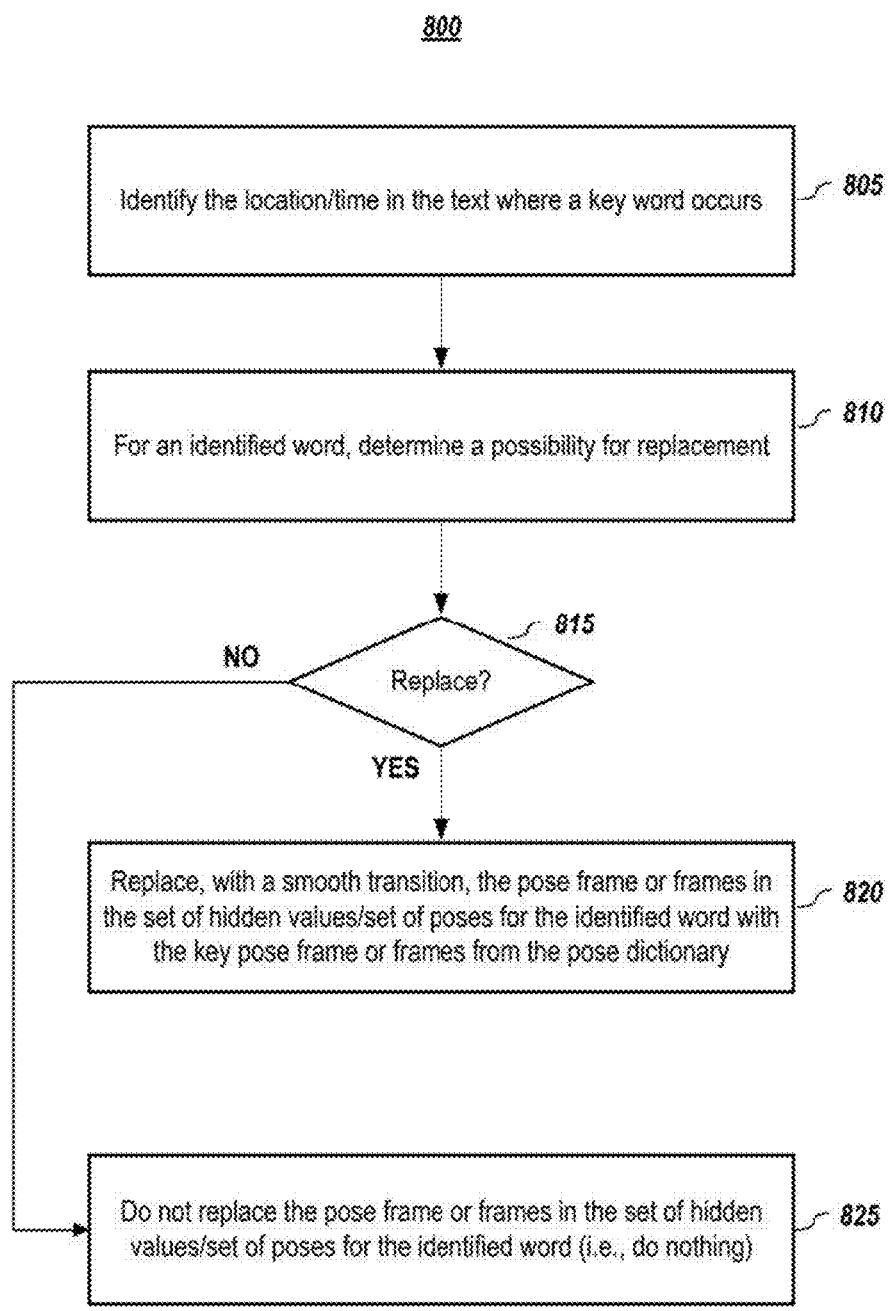
FIG. 8 depicts a method for replacing poses with key poses from a word-entry-to-pose dictionary, according to embodiments of the present disclosure.

FIG. 8 depicts a method for replacing poses with key poses from a word-entry-to-pose dictionary, according to embodiments of the present disclosure. In one or more embodiments, to insert a key pose, when its corresponding key word is spoken must be identified (805). For a text-to-speech (TTS) generated audio, the TTS output will include the timestamp of each word in the generated audio. In one or more embodiments, for an audio from a person, the audio may be input into a speech-to-text (STT) engine, which generates text script of the speech as well as the timestamp of each individual word. In either case, in one or more embodiments, the words in the speech script are examined for corresponding entries in the word-entry-to-pose dictionary. In one or more embodiments, for each word in the speech script that is found in the dictionary, a determination may be made (815) to insert it into the skeleton video by a certain possibility/probability. For example, if a probability value for the word exceeds a threshold value, it is replaced, otherwise, it is not replaced. Since some words like "I," "we," and "me" could be spoken a few times in a speech, it is unlikely that a real person would normally pose the same way every time they speak those words. Thus, in one or more embodiments, the pose frame or frames in the set of hidden values/set of poses for the identified word may not be replaced (825).

In one or more embodiments, the possibility of replacement may vary across different words and may be set when the dictionary is built or may be set by a user as a parameter or parameters for generating a video. In one or more embodiments, a probability of replacement distribution may be set for a word entry in the dictionary, and each time it occurs a probability value for insertion/replacement may be sampled from the distribution—although one skilled in the art shall recognize that other methodologies may be employed. Alternatively, or additionally, in one or more embodiments, the probability of replacement may be related to the frequency of occurrence of the word in the speech and/or on the proximity of those occurrences within the speech. For example, if the word or phrase occurs less than three times, it may always be replaced; or, for example, if the occurrence of the same word is close in proximity, then the probability of replacement for one or more of the close proximity occurrences may be changed to be less likely—even if the word does not occur frequently.

Figure 9:
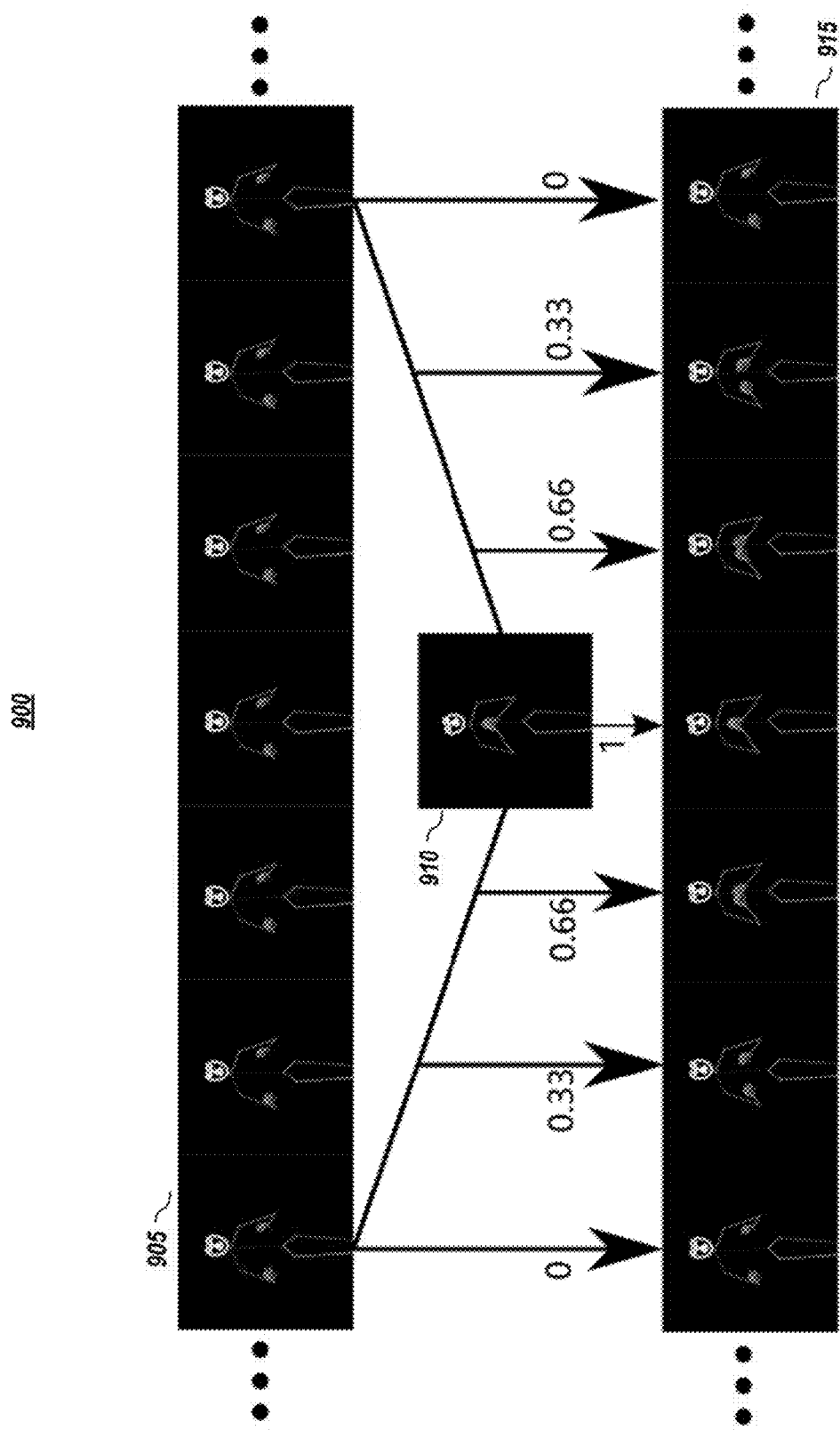
FIG. 9 graphically depicts inserting a key pose smoothly into an existing set of poses to generate a final sequence of poses, according to embodiments of the present disclosure.

In one or more embodiments, when a pose is inserted (820) into a video, a smooth interpolation may be used in the 106-parameter space. FIG. 9 graphically depicts inserting a key pose 910 smoothly into an existing set of poses 905 to generate a final sequence of poses 915, according to embodiments of the present disclosure. As illustrated in FIG. 9, a key pose 910 is inserted into a video 905 with a ramp length N frames before and after its insertion time point. In one or more embodiments, the ramp length depends on video frame rate and ramp duration. In the experiments herein, the ramp duration was set to be 0.6 seconds, and the key pose was directly copied to its time point within the sequence and overwrote the original frame. In one or more embodiments, to maintain a smooth transition to this pose, frames from a ramp start point to the key pose frame on both sides were also replaced, as illustrated in FIG. 9. In one or more embodiments, the new frames are linear interpolated between the ramp start/end frame and key pose frame, weighted by their distance to those two frames.

FIG. 9 depicts a ramp length that is only three frames, but the real ramp length may be much longer than this. The numbers alongside the vertical arrows are interpolation weights of the key pose. The weighted sum of ramp start/end pose and key pose 910 replaces the original frames 905 in between to obtain the final set of frames 915.

If the key pose is a single frame still pose, it may be inserted exactly as described above; however, in one or more embodiments, the pose may be held for a number of frames. People usually make a pose and keep it for a certain time period. Thus, instead of showing the key pose in one frame, embodiments may keep the key pose for a while. In the experiments herein, the pose was maintained for 0.3 seconds by duplicating the key pose frame in place multiple times. If the key pose is a motion (i.e., a sequence of frames), then, in one or more embodiments, it is copied to the target video to overwrite a sequence of the same length with the smoothness ramping done the same way as described above.

It shall be noted that other interpolation schemes and weightings may also be used.

6. Embodiment for Train Neural Networks

In one or more embodiments, when the neural network (which may be an LSTM neural network), which maps audio sequence to pose sequence, is trained, different parts of the human body may be given weights in the loss, because they have different scales. For example, in experiments herein, the relative weights for the body, hands, mouth, and face were set as 1, 4, 100, and 100, respectively—although different values may be applied. Embodiments may also enforce a smoothness constraint on the output pose sequence by adding a difference loss between two consecutive poses, in order to make sure the output motion is smooth and natural.

a) Audio-to-Pose Embodiments

In one or more embodiments, the audio features were extracted using standard MFCC coefficients. Because the input audio may have various volume levels, embodiments may first normalize the input audio's volume by RMS-based normalization. In one or more embodiments, for each audio clip portion (e.g., each 25 ms-length clip of the normalized input audio), a discrete Fourier Transform is applied to obtain its representation in the frequency domain. The audio clip may be sampled at 10 ms interval. In one or more embodiments, a set of filters (e.g., 40 triangular Mel-scale filters) are applied to the output of the Fourier Transform, followed by a logarithm operator. The output dimension may be reduced (e.g., reduced to 13 dimensions by applying a Discrete Cosine Transform). In one or more embodiments, the final feature is a 28-dimension vector, where the first 14 dimensions comprise the 13-dimension output of the Discrete Cosine Transform plus the log mean value of volume, and the second 14 dimensions represent temporal first-order derivatives of the first 14 dimension value (a.k.a., the difference to the previous feature vector).

b) Text-to-Pose Embodiments

Voices can be quite different person to person, even when they are speaking the same words. This natural variation may lead to poor performance of the neural network (e.g., LSTM) learning. Alternatively, in one or more embodiments, text—instead of audio—may be used to train the neural network. Therefore, if the input is audio, the audio is converted to text. Given the relatively maturity of natural language processing (NLP), there are quite a few prior works that do excellent jobs at converting—any of which may be employed.

For English and Latin-based audio, embodiments may directly use words as the input sequence to neural network, since word spelling itself incorporates pronunciation information. For example, ASCII values may be used to represent the words for input into the LSTM neural network, although other embeddings schemes may be employed. Embodiments may pad remaining pausing parts with 0's to form an entire input sequence.

For non-Latin-based languages (e.g., Chinese), its words/characters do not carry pronunciation information. In such cases, a generated output should have the same mouth shape and body pose when two characters of the same pronunciation are spoken. Therefore, embodiment may convert characters to representations with phoneme information. For Chinese, each individual character may be converted into pinyin, which comprises 26 English letters. It guarantees two characters have the same spelling if they have the same pronunciations.

D. Embodiments of Training a Video Generative Network

In one or more embodiments, a generative network, like the one proposed by vid2vid (which was referred above), is used to convert skeleton images into real person images—although other generative networks may be used. The rendering results of human bodies may not be equally important; typically, the most important parts are face and hands.

Figure 10:
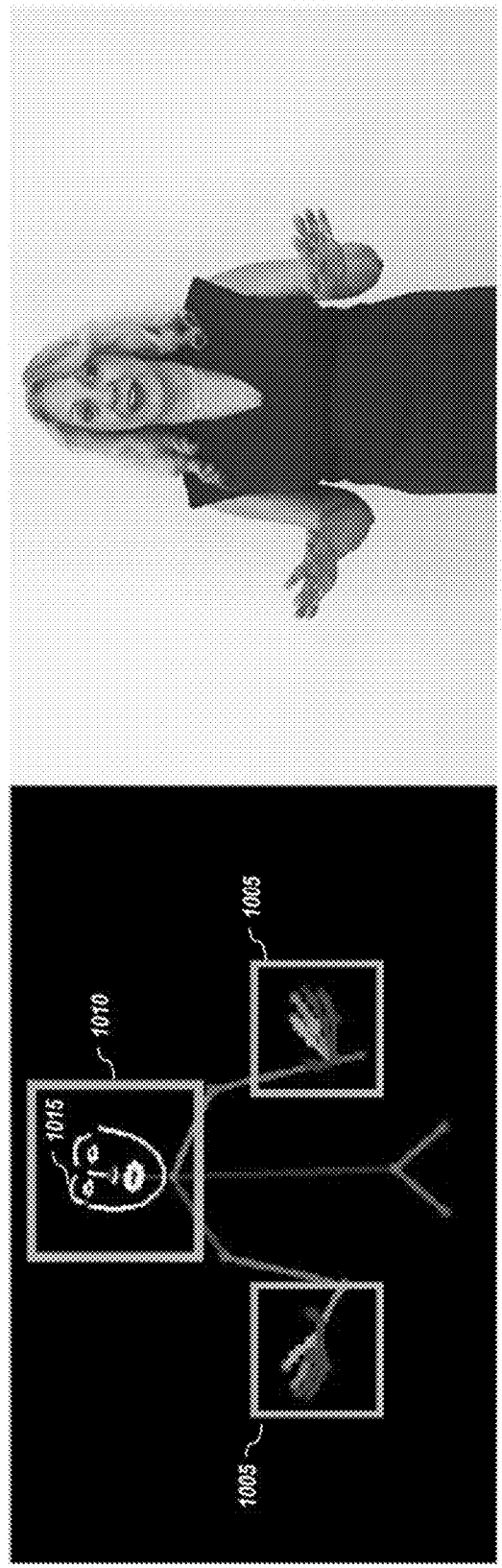
FIG. 10 depicts a sample image pair with emphasis, which may be used to train a generative network, according to embodiments of the present disclosure.

FIG. 10 depicts a sample image pair with emphasis, which may be used to train a generative network, according to embodiments of the present disclosure. In one or more embodiments, to make the generative network put more effort on generating details of face and both hands, the vid2vid network and the input images were modified to achieve this. Specifically, in one or more embodiments, a color shape (e.g., circle, rectangle, oval, etc.) was drawn on both hands 1005 on the input skeleton image and also drawn on the face part 1010 with white color 1015, which is different from other parts of body, as shown in FIG. 10. Within the network, an image is output from the generative network given an input image. Before it is passed to the discriminator network, regions of face and both hands are located by their special colors in the input image. Then, those three sub-images may be cropped from the generated image and passed to the discriminator network along with the entire output image. In one or more embodiments, the loss weights for those sub-images were carefully tuned to make sure the discriminator was more stringent on the reality of generated face and hands images.

E. Experimental Results

It shall be noted that these experiments and results are provided by way of illustration and were performed under specific conditions using a specific embodiment or embodiments; accordingly, neither these experiments nor their results shall be used to limit the scope of the disclosure of the current patent document.

Dataset.

To generate data, two models were hired to capture training data, one English speaking female and one Chinese speaking male. A total of 3 hours of videos for each model was captured when they were reading a variety of scripts, including politics, economy, sports, etc. Videos were captured at fixed $1/200$ second exposure time and 60 frames per second. Video resolution was 720×1280. To reduce data size, embodiments sampled every 5 frames from the video, and this subset data was used.

Running Times and Hardware.

The most time-consuming and memory-consuming stage of was training the modified vid2vid network embodiment. A cluster of 8 NVIDIA Tesla M40 24G GPUs, which is capable of training videos size of 512×512, was used. The network itself automatically cropped and resized the input 1280×720 video frames into 512×512 before the training. Therefore, all the results are at 512×512 resolution. There is no image resolution limit on the algorithm side. It is limited by the memory size of GPUs.

It takes about a week to finish 20 epochs of training on the GPU cluster. It was empirically found that the training of 20 epochs was a good trade-off between output image quality and time consumption. More epochs will take a significant amount of time, but the quality improvement is marginal. The testing stage is much faster. It takes only about 0.5 seconds to generate one frame on a single GPU. Training the LSTM neural network took a few hours on a single GPU, and testing takes only a few seconds to process a one-minute audio.

1. Evaluation and Analysis

Inception Score Comparison.

Note that it is not straightforward to compare with other methods, because: 1) there is no benchmark dataset to evaluate speech to full body videos, and 2) people's speech motion is quite subjective and personalized, which makes it difficult to define ground truth. The results were chosen to compare with SoTA (state of the art) approaches using inception scores. Inception score is a popular way to measure generated image quality of GANs. The score measures two things simultaneously: the image quality and the image diversity. We compare to SynthesizeObama (Suwajanakorn, S., Seitz, S. M., Kemelmacher-Shlizerman, I., "Synthesizing Obama: Learning Lip Sync from Audio," ACM Transactions on Graphics (TOG) 36(4), 95 (2017) (also available at grail.cs.washington.edu/projects/AudioToObama/ siggraph17_obama.pdf) and EverybodyDance (Chan, C., Ginosar, S., Zhou, T., Efros, A. A., "Everybody Dance Now," in Proceedings of the IEEE International Conference on Computer Vision, pp. 5933-5942 (2019) by computing inception scores on all the frames of videos generated by each method.

Table 1 shows inception scores for all three methods. IS is the score for generated videos and GT IS is the score for ground truth videos. For SynthesizeObama, the ground truth is the source video of the input audio. For EverybodyDance, the ground truth is the source video to transfer motion from. And for the test embodiment of the present disclosure, the ground truth is the training video. It is expected that dancing videos (EverybodyDance) have higher scores than speech videos (the tested embodiment), and speech videos (the tested embodiment) have higher scores than talking head (SynthesizeObama), since dancing has the most motion varieties. Therefore, the absolute inception score cannot be used to measure the output video quality. Instead, the relative inception scores (inception score of generated videos to ground truth videos) was used to measure similarity to the ground truth. The test embodiment outperforms the other two methods by this standard, meaning the visual quality of the generated video of the tested embodiment is closer to ground truth.

TABLE 1

Inception scores for generated videos (IS) and ground truth videos (GT IS) of different methods. The relative inception score (Rel. IS) is the ratio of the first to the second.

|  | SynthesizeObama | EverybodyDance | Tested Embodiment |
| --- | --- | --- | --- |
| IS | 1.039 | 1.690 | 1.286 |
| GT IS | 1.127 | 1.818 | 1.351 |
| Rel. IS | 0.921 | 0.929 | 0.952 |

Numerical Evaluation.

Since people do not pose exactly the same, even if the same person speaks the same sentence twice. So, it is difficult to tell if the generated body motion is good or not, due to lacking of ground truth. The only part that tends to take the same shape when speaking the same words is mouth. Thus, only mouth appearance was used to evaluate the motion reconstruction accuracy. Specifically, a separate video was recorded of the models when they spoke totally different sentences than in the training dataset. The audio and input were extracted into the pipeline. The output 3D joints of the mouth were projected onto the image space, which were compared to those 2D mouth keypoints detected by OpenPose. The errors were measured by average pixel distance.

TABLE 2

Numerical evaluation on mouth motion reconstruction of the test
embodiments. The number here represents average pixel distance.

|       | Original | Man1  | Man2  | Man3  | Text  |
|-------|----------|-------|-------|-------|-------|
| 0.5 h | 1.769    | 1.838 | 1.911 | 1.992 | 2.043 |
| 1 h   | 1.730    | 1.868 | 1.983 | 2.012 | 2.024 |
| 2 h   | 1.733    | 1.809 | 1.930 | 2.047 | 1.993 |

As reported in Table 2, several evaluations were performed on the mouth motion reconstruction, some interesting facts were found. The LSTM neural network was first trained using different dataset sizes to see how it affected the reconstruction accuracy. Datasets of varying length including 0.5 hour, 1 hour, and 2 hours were used. The voice of the same lady (Orig.) as in training data was used to do the evaluation. In addition, the pitch of the original voice was lowered to simulate a man's voice, in order to see how voice variation affect the results. Voices of a young man (Man1), a middle-aged man (Man2), and an old man (Man3) were simulated by successively lower pitch values of the original audio. Finally, the LSTM neural network was trained and tested using text and the results were comparted to those of audio.

There are at least three observations from Table 2. First, audio has better accuracy than text. Second, longer training dataset does not necessarily increase the accuracy for audio, but it indeed helps for text. Third, accuracy gets worse when the voice deviates more from the original one. The third observation is easy to understand—one expects worse performance if the test voice sounds different from the training voice. For the first and second observations, an explanation is that audio space is smaller than text space, because some words/characters share the same pronunciation, for example, pair vs pear, see vs sea. Therefore, audio training data covers larger parts in its own space than text training data of the same length. In experiments here, it appears that 0.5-hour length audio is enough to cover the entire pronunciation space. Adding more training data does not appear to help increase accuracy. On the other hand, 2-hour length text may still not be enough to cover the entire spelling space, so the error keeps decreasing as the length of training data increased.

User Study.

To evaluate the final output videos, a human subjective test was conducted on Amazon Mechanical Turk (AMT) with 112 participants. A total of five videos were shown to the participants. Four of them were synthesized videos, two of which were generated by real person audios and the other two are generated by TTS audios. The remaining one was a short clip of a real person. Those five videos were ordered randomly, and the participants were not told that there was a real video. The participants were required to rate the quality of those videos on a Likert scale from 1 (strongly disagree) to 5 (strongly agree). Those include: 1) Completeness of human body (no missing body parts or hand fingers); 2) The face in the video is clear; 3) The human motion (arm, hand, body gesture) in the video looks natural and smooth; 4) The body movement and gesture is correlated with audio; and 5) Overall visual quality of the video and it looks real.

As shown in Table 3, the synthesis video of the test embodiment (Synth.) received 3.42 and the real video received 4.38 (out of 5), which means the synthesis video is 78.08% overall quality of the real video. In particular, the tested embodiment has the same performance on body completeness and face clarity compared to real video. Another discovery was that, for the tested embodiment, the TTS-generated videos were worse than real-audio generated videos in all aspects. Reasons for such may be twofold. First, TTS audios are generally more distant to real audios in MFCC feature space, leading to worse reconstructed motions and gestures (conclusion from Table 2). Secondly, TTS audio itself sounds artificial/fake, which decreases the overall video quality.

TABLE 3

Average scores of 112 participants on 5 questions: Q1:
Completeness of body; Q2: The face is clear; Q3: The
human motion looks natural; Q4: The body movement is
correlated with audio; and Q5: Overall quality.

|        | Q1   | Q2   | Q3   | Q4   | Q5   |
|--------|------|------|------|------|------|
| Synth. | 4.12 | 4.21 | 2.86 | 3.07 | 3.42 |
| TTS    | 4.07 | 3.81 | 2.67 | 2.88 | 3.28 |
| Real   | 4.28 | 4.38 | 4.45 | 4.35 | 4.38 |

2. Ablation Study

TTS Noise.

Figure 11:
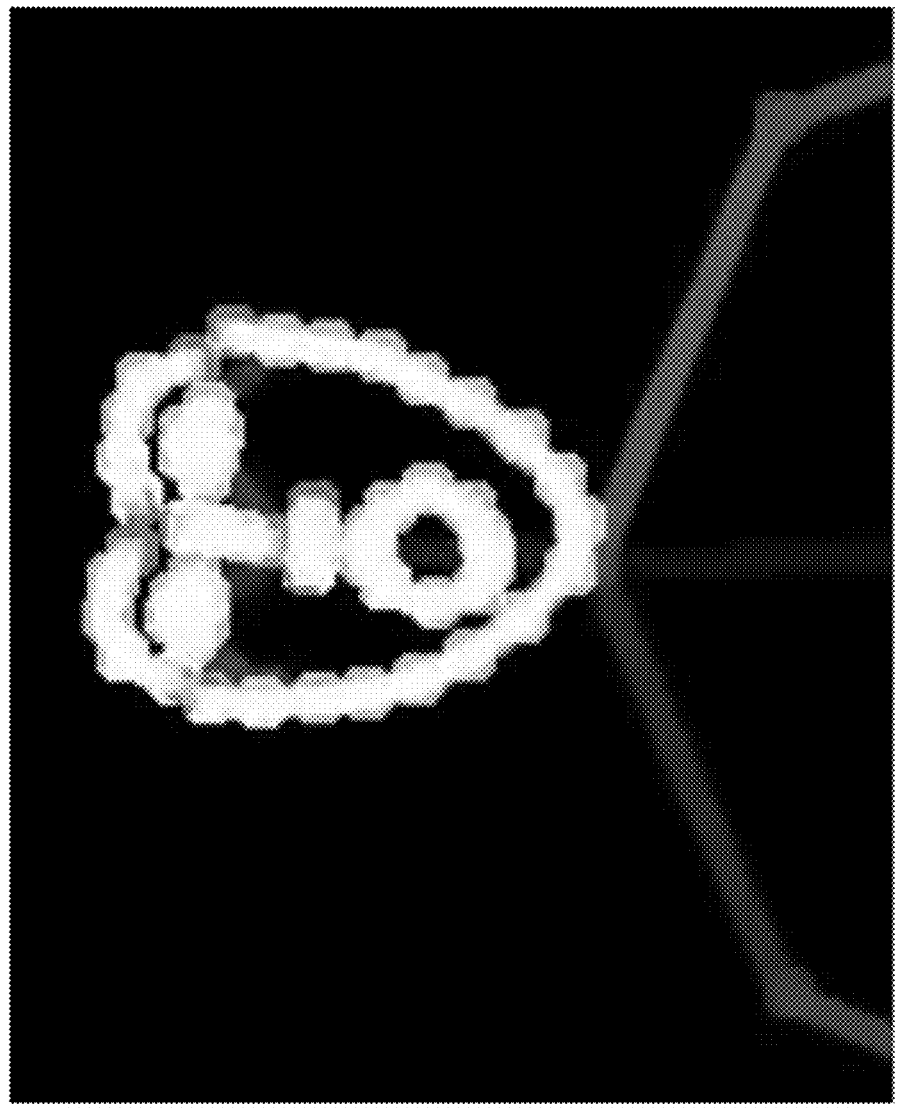
FIG. 11 depicts one frame generated by text-to-speech audio when people pause speaking, which may result in mouth shape distortion.

When the test LSTM neural network was trained, the audios were extracted from recorded videos, meaning they contain background noise when people were not speaking. However, TTS generated audios have an absolutely clear background when people speaking pauses. That difference causes some problems in the output skeleton motions. As can be seen in FIG. 11, mouth shape is distorted because the test embodiment network has never seen this absolutely clear signal in the training. In one or more embodiments, to fix this issue, some white noise was added to the TTS-generated audios before feeding them to the LSTM neural network.

Hand Model.

As mentioned before, in one or more embodiments, it may be important to have hands in the skeleton model to render hand details in the final output of the trained generative network. Due to motion blur, it may be difficult to fit a correct hand model to the video frames. Thus, in one or more embodiments, the generative network was trained without hand skeleton, all the way up to 40 epochs. However, it is still difficult to render clear hand images in the final output. This is also evidence of why the end-to-end approach may not work. A very detailed spatial guidance may be important for the GAN network to produce high fidelity rendering. An audio input may not provide this spatial guidance. Thus, in one or more embodiments, an end-to-end method approach was not employed.

Key Pose Insertion.

To justify the effectiveness of key pose insertion embodiments, another user study was conducted. In this study, pairs of synthesized videos with and without inserted key poses were presented to participants. The participants just needed to choose which one was more expressive. For all participants, videos with key poses received 80.6% of the votes compared to 19.4% for videos without key poses. These results demonstrate the benefit of inserting key poses to enrich the expressiveness of speech.

Video Results.

Figure 12:
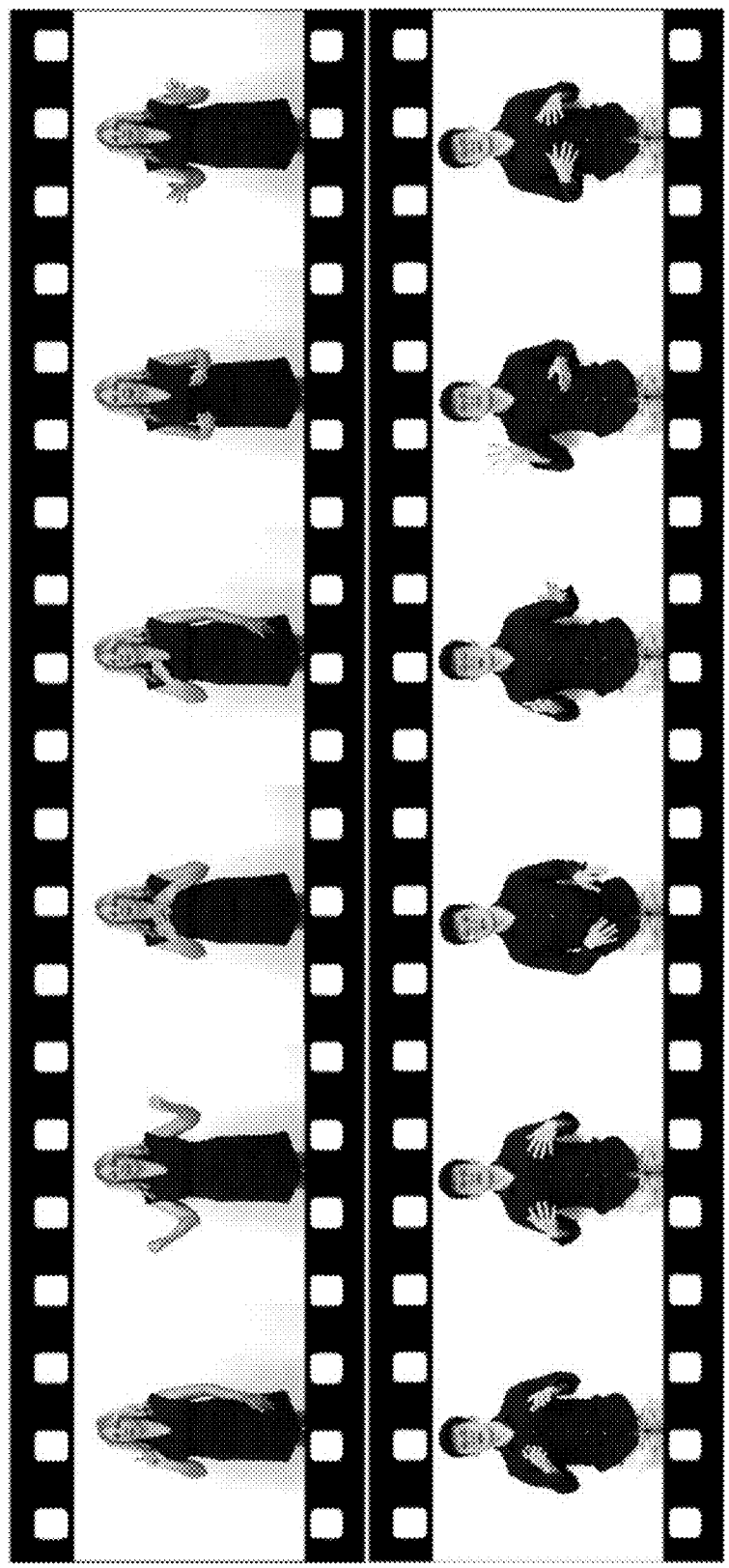
FIG. 12 depicts some frames from generated videos, according to embodiments of the present disclosure.

FIG. 12 depicts some frames from generated videos, according to embodiments of the present disclosure.

F. Some Conclusions

Presented herein were embodiments of a novel framework to generate realistic speech videos using a 3D driven approach, while avoid building 3D mesh models. In one or more embodiments, a table of personal key gestures were built inside the framework to handle the problem of data sparsity and diversity. Also, in one or more embodiments, 3D skeleton constraints were used to generate body dynamics, which guarantees the poses to be physically plausible.

It shall be noted that key gesture may include more body language elements, such as facial expression, eye movement, etc. Also, since embodiments have a 3D pose model, a single-view speech video may be extended to multi-view. From this patent document, experiments show that explicit 3D modeling can help generate better results with fewer training data.

G. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen and/or video display. The computing system may also include one or more buses operable to transmit communications between the various hardware components.

Figure 13:
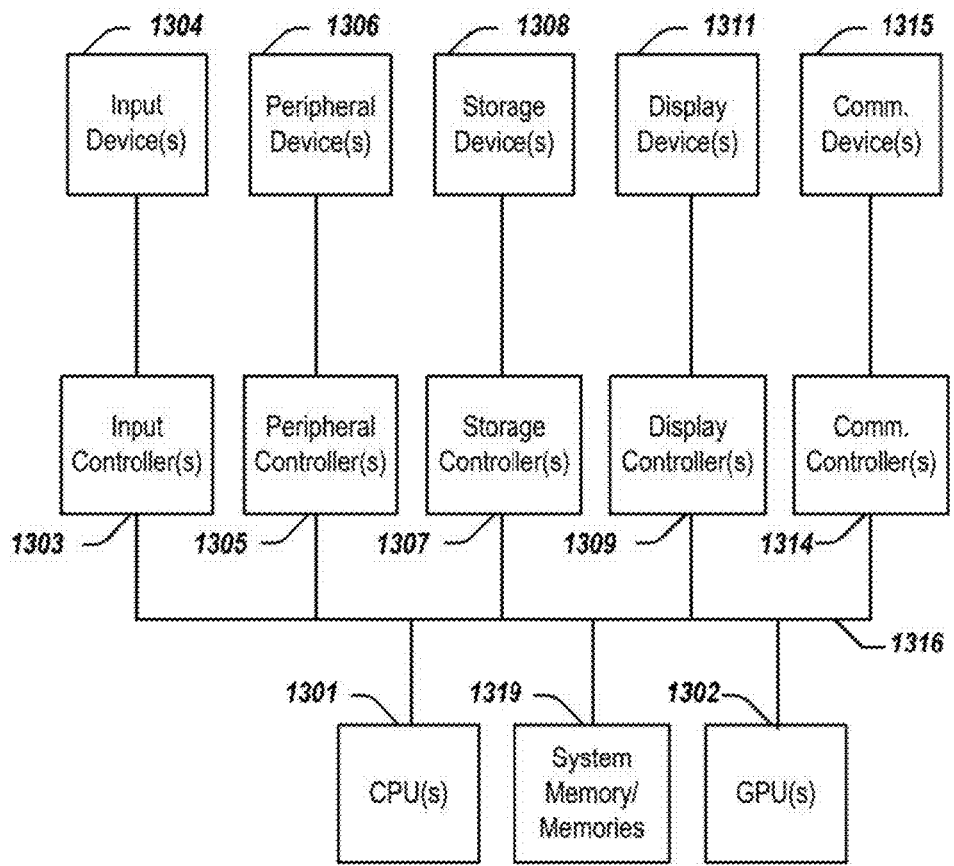
FIG. 13 depicts a simplified block diagram of a computing device/information handling system, according to embodiments of the present disclosure.

FIG. 13 depicts a simplified block diagram of an information handling system (or computing system), according to embodiments of the present disclosure. It will be understood that the functionalities shown for system 1300 may operate to support various embodiments of a computing system—although it shall be understood that a computing system may be differently configured and include different components, including having fewer or more components as depicted in FIG. 13.

As illustrated in FIG. 13, the computing system 1300 includes one or more central processing units (CPU) 1301 that provides computing resources and controls the computer. CPU 1301 may be implemented with a microprocessor or the like, and may also include one or more graphics processing units (GPU) 1302 and/or a floating-point coprocessor for mathematical computations. In one or more embodiments, one or more GPUs 1302 may be incorporated within the display controller 1309, such as part of a graphics card or cards. Thy system 1300 may also include a system memory 1319, which may comprise RAM, ROM, or both.

A number of controllers and peripheral devices may also be provided, as shown in FIG. 13. An input controller 1303 represents an interface to various input device(s) 1304, such as a keyboard, mouse, touchscreen, and/or stylus. The computing system 1300 may also include a storage controller 1307 for interfacing with one or more storage devices 1308 each of which includes a storage medium such as magnetic tape or disk, or an optical medium that might be used to record programs of instructions for operating systems, utilities, and applications, which may include embodiments of programs that implement various aspects of the present disclosure. Storage device(s) 1308 may also be used to store processed data or data to be processed in accordance with the disclosure. The system 1300 may also include a display controller 1309 for providing an interface to a display device 1311, which may be a cathode ray tube (CRT) display, a thin film transistor (TFT) display, organic light-emitting diode, electroluminescent panel, plasma panel, or any other type of display. The computing system 1300 may also include one or more peripheral controllers or interfaces 1305 for one or more peripherals 1306. Examples of peripherals may include one or more printers, scanners, input devices, output devices, sensors, and the like. A communications controller 1314 may interface with one or more communication devices 1315, which enables the system 1300 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1316, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for training a system to generate a video of a person given an input text or an input audio comprising:
   given an input video comprising a person speaking and gesturing, using the input video and a joint three-dimensional (3D) model of a human body, face, and hands to generate a set of 3D poses corresponding to the person speaking and gesturing in the input video;
   using speech information related to the person speaking in the input video and a neural network model to generate a set of hidden states, which represent a set of 3D poses;
   comparing the set of hidden states from the neural network model with the set of 3D poses from the joint 3D model of a human body, face, and hands to train the neural network model, in which the set of 3D poses from the joint 3D model of a human body, face, and hands are treated as ground truth data;
   using the input video, the set of 3D poses from the joint 3D model of a human body, face, and hands, and a video generative adversarial network (GAN) to train a generative network of the video GAN to generate a video; and
   outputting the trained neural network and the trained generative network.

2. The computer-implemented method of claim 1 wherein the step of given an input video comprising a person speaking and gesturing, using the input video and a joint three-dimensional (3D) model of a human body, face, and hands to generate a set of 3D poses corresponding to the person speaking and gesturing in the input video, comprises:
   inputting the input video comprising the person speaking and gesturing into a pose model that generates a set of a two-dimensional (2D) skeleton poses of the person as they speak and gesture in the input video; and
   using the set of 2D skeleton poses and the joint 3D model of a human body, face, and hands to generate the set of 3D poses corresponding to the set of 2D skeleton poses.

3. The computer-implemented method of claim 1 further comprising:
   selecting a set of key poses from the input video to form a key pose dictionary in which an entry in the key pose dictionary correlates a word or words to one or more poses.

4. The computer-implemented method of claim 3 further comprising:
   for at least some of the entries in the key pose dictionary assigning a probability of replacement.

5. The computer-implemented method of claim 1 wherein the step of using the input video, the set of 3D poses from the joint 3D model of a human body, face, and hands, and a video generative adversarial network (GAN) to train a generative network of the video GAN to generate video, comprises:
   projecting the set of 3D poses from the joint 3D model of a human body, face, and hands to a set of projected 2D poses; and
   using the input video and the set of projected 2D poses as inputs to the video GAN.

6. The computer-implemented method of claim 1 wherein the speech information related to the person speaking in the input video comprises audio from the input video and wherein the step of using speech information related to the person speaking in the input video and a neural network model to generate a set of hidden states, which represent a set of 3D poses, comprises:
   generating a set of audio signal representations of the audio from the input video; and
   inputting the set of audio signal representations as an input into the neural network to generate the set of hidden states.

7. The computer-implemented method of claim 1 wherein the speech information related to the person speaking in the input video comprises a text of words spoken by the person in the input video and wherein the step of using speech information related to the person speaking in the input video and a neural network model to generate a set of hidden states, which represent a set of 3D poses, comprises:
   generating a set of numerical representations of the text of words spoken by the person in the input video; and
   inputting the set of numerical representations into the neural network to generate the set of hidden states.

8. The computer-implemented method of claim 7 wherein the text of words spoken by the person in the input video is obtained by performing the step comprising:

applying a speech-to-text converter to audio from the input video to covert the audio to the text of words spoken by the person in the input video.

9. A non-transitory computer-readable medium or media comprising one or more sequences of instructions which, when executed by one or more processors, causes the method according to claim 1 to be implemented.

10. A system for training a system to generate a video of a person given an input text or an input audio comprising:
   at least one processor; and
   a memory storing instructions, the instruction when executed by the at least one processor, cause the at least one processor to perform the method according to claim 1.

11. A computer-implemented method for synthesizing a video of a person given an input speech data, the method comprising:
   generating a set of speech representations corresponding to the input speech data;
   inputting the set of speech representations into a trained neural network to generate an initial set of three-dimensional (3D) poses corresponding to the set of speech representations;
   identifying, using the input speech data, a set of words in the input speech data that correspond to a set of word entries in a key pose dictionary, which comprises, for each word entry in the key pose dictionary, one or more poses;
   responsive to identifying a word in the set of words from the input speech data that exists in the key pose dictionary that is set for replacement, forming a final set of 3D poses by replacing a set of one or more 3D poses from the initial set of 3D poses that are correlated to occurrence of the word in the initial set of 3D poses with a replacement set of one or more 3D poses obtained from the key pose dictionary that corresponds to the word; and
   generating a video of a person that poses in correspondence with the input speech data using the final set of 3D poses as an input into a trained generative network.

12. The computer-implemented method of claim 11 wherein the input speech data comprises audio and the step of generating a set of speech representations corresponding to the input speech data comprises:
   generating a set of audio signal representations of the audio.

13. The computer-implemented method of claim 12 wherein the step of identifying, using the input speech data, a set of words in the input speech data that correspond to a set of word entries in a key pose dictionary comprises:
   using a speech-to-text converter to covert the audio to the text; and
   identifying in the text the set of words that correspond to a set of word entries in a key pose dictionary.

14. The computer-implemented method of claim 11 wherein the input speech data comprises text and the step of generating a set of speech representations corresponding to the input speech data comprises:
   generating a set of audio signal representations of the audio.

15. The computer-implemented method of claim 14 wherein the step of identifying, using the input speech data, a set of words in the input speech data that correspond to a set of word entries in a key pose dictionary comprises:
   identifying in the text the set of words that correspond to a set of word entries in a key pose dictionary.

16. The computer-implemented method of claim 11 wherein the step of responsive to identifying a word in the set of words from the input speech data that exists in the key pose dictionary that is set for replacement, forming a final set of 3D poses by replacing a set of one or more 3D poses from the initial set of 3D poses that are correlated to occurrence of the word in the initial set of 3D poses with a replacement set of one or more 3D poses obtained from the key pose dictionary that corresponds to the word, comprises:
   responsive to identifying a word in the set of words from the input speech data that exists in the key pose dictionary, determining a probability of replacement; and
   responsive to the probability of replacement for the word exceeding a threshold, forming the final set of 3D poses by replacing the set of one or more 3D poses from the initial set of 3D poses that are correlated to occurrence of the word in the initial set of 3D poses with the replacement set of one or more 3D poses obtained from the key pose dictionary that corresponds to the word.

17. The computer-implemented method of claim 11 wherein the step of forming a final set of 3D poses by replacing a set of one or more 3D poses from the initial set of 3D poses that are correlated to occurrence of the word in the initial set of 3D poses with a replacement set of one or more 3D poses obtained from the key pose dictionary that corresponds to the word, comprises:
   using a smooth transition to replace the set of one or more 3D poses from the initial set of 3D poses that are correlated to occurrence of the word with the replacement set of one or more 3D poses obtained from the key pose dictionary.

18. A system for training a system to generate a video of a person given an input text or an input audio comprising:
   at least one processor; and
   a memory storing instructions, the instruction when executed by the at least one processor, cause the at least one processor to perform the method according to claim 11.

19. A non-transitory computer-readable medium or media comprising one or more sequences of instructions which, when executed by one or more processors, causes steps for synthesizing a video of a person given an input speech data to be implemented, the steps comprising:
   generating a set of speech representations corresponding to the input speech data;
   inputting the set of speech representations into a trained neural network to generate an initial set of three-dimensional (3D) poses corresponding to the set of speech representations;
   identifying, using the input speech data, a set of words in the input speech data that correspond to a set of word entries in a key pose dictionary, which comprises, for each word entry in the key pose dictionary, one or more poses;
   responsive to identifying a word in the set of words from the input speech data that exists in the key pose dictionary that is set for replacement, forming a final set of 3D poses by replacing a set of one or more 3D poses from the initial set of 3D poses that are correlated to occurrence of the word in the initial set of 3D poses with a replacement set of one or more 3D poses obtained from the key pose dictionary that corresponds to the word; and
   generating a video of a person that poses in correspondence with the input speech data using the final set of 3D poses as an input into a trained generative network.

20. The non-transitory computer-readable medium or media of claim 19 wherein the input speech data comprises audio and the step of generating a set of speech representations corresponding to the input speech data comprises:
   generating a set of audio signal representations of the audio.

21. The non-transitory computer-readable medium or media of claim 20 wherein the step of identifying, using the input speech data, a set of words in the input speech data that correspond to a set of word entries in a key pose dictionary comprises:
   using a speech-to-text converter to covert the audio to the text; and
   identifying in the text the set of words that correspond to a set of word entries in a key pose dictionary.

22. The non-transitory computer-readable medium or media of claim 19 wherein the input speech data comprises text and the step of generating a set of speech representations corresponding to the input speech data comprises:
   generating a set of audio signal representations of the audio.

23. The non-transitory computer-readable medium or media of claim 19 wherein the step of responsive to identifying a word in the set of words from the input speech data that exists in the key pose dictionary that is set for replacement, forming a final set of 3D poses by replacing a set of one or more 3D poses from the initial set of 3D poses that are correlated to occurrence of the word in the initial set of 3D poses with a replacement set of one or more 3D poses obtained from the key pose dictionary that corresponds to the word, comprises:
   responsive to identifying a word in the set of words from the input speech data that exists in the key pose dictionary, determining a probability of replacement; and
   responsive to the probability of replacement for the word exceeding a threshold, forming the final set of 3D poses by replacing the set of one or more 3D poses from the initial set of 3D poses that are correlated to occurrence of the word in the initial set of 3D poses with the replacement set of one or more 3D poses obtained from the key pose dictionary that corresponds to the word.

24. The non-transitory computer-readable medium or media of claim 19 wherein the step of forming a final set of 3D poses by replacing a set of one or more 3D poses from the initial set of 3D poses that are correlated to occurrence of the word in the initial set of 3D poses with a replacement set of one or more 3D poses obtained from the key pose dictionary that corresponds to the word, comprises:
   using a smooth transition to replace the set of one or more 3D poses from the initial set of 3D poses that are correlated to occurrence of the word with the replacement set of one or more 3D poses obtained from the key pose dictionary.

* * * * *